(12) United States Patent
Sapugay et al.

(10) Patent No.: US 11,487,945 B2
(45) Date of Patent: Nov. 1, 2022

(54) PREDICTIVE SIMILARITY SCORING SUBSYSTEM IN A NATURAL LANGUAGE UNDERSTANDING (NLU) FRAMEWORK

(71) Applicant: ServiceNow, Inc., Santa Clara, CA (US)

(72) Inventors: Edwin Sapugay, Foster City, CA (US); Jonggun Park, Santa Clara, CA (US); Anne Katharine Heaton-Dunlap, Menlo Park, CA (US)

(73) Assignee: ServiceNow, Inc., Santa Clara, CA (US)

( * ) Notice: Subject to any disclaimer, the term of this patent is extended or adjusted under 35 U.S.C. 154(b) by 348 days.

(21) Appl. No.: 16/570,506

(22) Filed: Sep. 13, 2019

(65) Prior Publication Data

US 2021/0004442 A1 Jan. 7, 2021

Related U.S. Application Data

(60) Provisional application No. 62/869,811, filed on Jul. 2, 2019, provisional application No. 62/869,826, filed on
(Continued)

(51) Int. Cl.
*G06F 40/30* (2020.01)
*G06F 40/295* (2020.01)
(Continued)

(52) U.S. Cl.
CPC ........ *G06F 40/30* (2020.01); *G06F 16/24556* (2019.01); *G06F 16/686* (2019.01);
(Continued)

(58) Field of Classification Search
CPC .. G06F 40/30; G06F 40/253; G06F 16/24556; G06F 16/686; G06F 40/295;
(Continued)

(56) References Cited

U.S. PATENT DOCUMENTS 5,978,594 A   11/1999 Bonnell
6,321,229 B1   11/2001 Goldman
(Continued)

OTHER PUBLICATIONS

Torres-Martínez, Sergio. "Working out multiword verbs within an Applied Cognitive Construction Grammar framework." European Journal of Applied Linguistics 5.1 (2017): 55-86. (Year: 2017).*
(Continued)

*Primary Examiner* — Paras D Shah
(74) *Attorney, Agent, or Firm* — Fletcher Yoder PC

(57) ABSTRACT

Present embodiments include an agent automation framework having a similarity scoring subsystem that performs meaning representation similarity scoring to facilitate extraction of artifacts to address an utterance. The similarity scoring subsystem identifies a CCG form of an utterance-based meaning representation and queries a database to retrieve a comparison function list that enables quantifications of similarities between the meaning representation and candidates within a search space. The comparison functions enable the similarity scoring subsystem to perform computationally-cheapest and/or most efficient comparisons before other comparisons. The similarity scoring subsystem may determine an initial similarity score between the particular meaning representation and the candidates of the search space, then prune non-similar candidates from the search space. Selective search space pruning enables the similarity scoring subsystem to iteratively compare more data of the meaning representation to the search space via increasingly-complex comparison functions, while narrowing the search space to potentially-matching candidates.

19 Claims, 14 Drawing Sheets

Related U.S. Application Data on Jul. 2, 2019, provisional application No. 62/869,864, filed on Jul. 2, 2019, provisional application No. 62/869,817, filed on Jul. 2, 2019.

(51) Int. Cl.
  *G06F 40/253* (2020.01)
  *G06F 40/205* (2020.01)
  *G06F 16/2455* (2019.01)
  *G06F 16/68* (2019.01)

(52) U.S. Cl.
  CPC .......... *G06F 40/253* (2020.01); *G06F 40/295* (2020.01); *G06F 40/205* (2020.01)

(58) Field of Classification Search
  CPC ...... G06F 40/205; G06F 40/194; G06F 21/60; G06F 21/10; G06F 16/93; G06F 16/30; G06F 16/90; G06F 40/20; G10L 25/48; G10L 25/00; G10L 15/02; G10L 15/00; G10L 15/063; G10L 2015/0635; G10L 2015/0636; G10L 15/10; G10L 15/22; G10L 2015/221; G06N 20/00; G06N 3/08
  See application file for complete search history.

(56) References Cited

U.S. PATENT DOCUMENTS

| | | |
|---|---|---|
| 6,609,122 B1 | 8/2003 | Ensor |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |
| 7,509,653 B2 | 3/2009 | Das et al. |
| 7,610,512 B2 | 10/2009 | Gerber |
| 7,617,073 B2 | 11/2009 | Trinon |
| 7,617,500 B2 | 11/2009 | Astl et al. |
| 7,630,784 B2 | 12/2009 | Hunt et al. |
| 7,653,650 B2 | 1/2010 | Kulkarni et al. |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,877,783 B1 | 1/2011 | Cline |
| 7,890,802 B2 | 2/2011 | Gerber |
| 7,925,981 B2 | 4/2011 | Pourheidari |
| 7,930,396 B2 | 4/2011 | Trinon |
| 8,006,240 B2 | 4/2011 | Bhatkhande et al. |
| 7,941,506 B2 | 5/2011 | Bonal |
| 7,945,860 B2 | 5/2011 | Vambenepe |
| 7,958,031 B2 | 6/2011 | Hunt et al. |
| 7,966,398 B2 | 6/2011 | Wiles |
| 8,051,164 B2 | 11/2011 | Peuter |
| 8,082,222 B2 | 12/2011 | Rangarajan |
| 8,156,479 B2 | 4/2012 | Fong et al. |
| 8,224,683 B2 | 7/2012 | Manos |
| 8,266,096 B2 | 9/2012 | Navarrete |
| 8,346,752 B2 | 1/2013 | Sirota |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangarajan |
| 8,646,093 B2 | 2/2014 | Myers |
| 8,674,992 B2 | 3/2014 | Poston |
| 8,683,032 B2 | 3/2014 | Spinelli |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 8,907,988 B2 | 12/2014 | Poston |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,261,372 B2 | 2/2016 | Cline |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,557,969 B2 | 1/2017 | Sharma |
| 9,534,903 B2 | 4/2017 | Cline |
| 9,613,070 B2 | 4/2017 | Kumar |
| 9,626,717 B2 | 4/2017 | Sapugay et al. |
| 9,631,934 B2 | 4/2017 | Cline |
| 9,633,004 B2 | 4/2017 | Giuli et al. |
| 9,645,833 B2 | 5/2017 | Mueller |
| 9,654,473 B2 | 5/2017 | Miller |
| 9,659,051 B2 | 5/2017 | Hutchins |
| 9,792,387 B2 | 10/2017 | George |
| 9,852,165 B2 | 12/2017 | Morozov |
| 9,967,162 B2 | 5/2018 | Spinelli |
| 10,002,203 B2 | 6/2018 | George |
| 2006/0130038 A1 | 6/2006 | Claussen et al. |
| 2007/0261065 A1 | 11/2007 | Astl et al. |
| 2014/0297457 A1 | 10/2014 | Sapugay et al. |
| 2014/0297458 A1 | 10/2014 | Sapugay et al. |
| 2016/0147736 A1* | 5/2016 | Danielyan ............ G06V 30/414 704/9 |
| 2017/0069310 A1* | 3/2017 | Hakkani-Tur ...... G10L 15/1822 |
| 2017/0371861 A1 | 12/2017 | Barborak et al. |
| 2019/0325023 A1* | 10/2019 | Awadallah ........... G06N 3/0454 |
| 2019/0392066 A1* | 12/2019 | Kim ................. G06F 16/24578 |
| 2020/0073950 A1* | 3/2020 | Ruan .................. G06F 16/3332 |
| 2021/0342548 A1* | 11/2021 | Galitsky ................. G06F 40/30 704/9 |

OTHER PUBLICATIONS

International Search Report and Written Opinion for PCT Application No. PCT/US2020/040569 dated Oct. 9, 2020; 13 pgs.
U.S. Appl. No. 62/869,864, filed Jul. 2, 2019, Sapugay et al.
U.S. Appl. No. 62/869,811, filed Jul. 2, 2019, Sapugay et al.
U.S. Appl. No. 16/238,324, filed Jan. 2, 2019, Sapugay et al.
U.S. Appl. No. 16/238,331, filed Jan. 2, 2019, Sapugay et al.
U.S. Appl. No. 16/356,815, filed Mar. 18, 2019, Sapugay et al.
U.S. Appl. No. 16/179,681, filed Nov. 2, 2018, Sapugay et al.
U.S. Appl. No. 16/239,147, filed Jan. 3, 2019, Sapugay et al.
U.S. Appl. No. 16/239,218, filed Jan. 3, 2019, Sapugay et al.
U.S. Appl. No. 16/298,764, filed Mar. 11, 2019, Sapugay et al.
U.S. Appl. No. 16/552,493, filed Aug. 27, 2019, Sapugay et al.

* cited by examiner

PREDICTIVE SIMILARITY SCORING SUBSYSTEM IN A NATURAL LANGUAGE UNDERSTANDING (NLU) FRAMEWORK

CROSS-REFERENCES

This application claims priority from and the benefit of U.S. Provisional Application No. 62/869,817, entitled "PREDICTIVE SIMILARITY SCORING SUBSYSTEM IN A NATURAL LANGUAGE UNDERSTANDING (NLU) FRAMEWORK," filed Jul. 2, 2019, which is incorporated by reference herein in its entirety for all purposes. This application is also related to U.S. Provisional Application No. 62/869,864, entitled "SYSTEM AND METHOD FOR PERFORMING A MEANING SEARCH USING A NATURAL LANGUAGE UNDERSTANDING (NLU) FRAMEWORK"; U.S. Provisional Application No. 62/869,826, entitled "DERIVING MULTIPLE MEANING REPRESENTATIONS FOR AN UTTERANCE IN A NATURAL LANGUAGE UNDERSTANDING (NLU) FRAMEWORK"; and U.S. Provisional Application No. 62/869,811, entitled "PINNING ARTIFACTS FOR EXPANSION OF SEARCH KEYS AND SEARCH SPACES IN A NATURAL LANGUAGE UNDERSTANDING (NLU) FRAMEWORK," which were each filed Jul. 2, 2019 and are incorporated by reference herein in their entirety for all purposes.

BACKGROUND

The present disclosure relates generally to the fields of natural language understanding (NLU) and artificial intelligence (AI), and more specifically, to a predictive similarity scoring subsystem for NLU.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations and these resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

Such a cloud computing service may host a virtual agent, such as a chat agent, that is designed to automatically respond to issues with the client instance based on natural language requests from a user of the client instance. For example, a user may provide a request to a virtual agent for assistance with a password issue, wherein the virtual agent is part of a Natural Language Processing (NLP) or Natural Language Understanding (NLU) system. NLP is a general area of computer science and AI that involves some form of processing of natural language input. Examples of areas addressed by NLP include language translation, speech generation, parse tree extraction, part-of-speech identification, and others. NLU is a sub-area of NLP that specifically focuses on understanding user utterances. Examples of areas addressed by NLU include question-answering (e.g., reading comprehension questions), article summarization, and others. For example, an NLU may use algorithms to reduce human language (e.g., spoken or written) into a set of known symbols for consumption by a downstream virtual agent. NLP is generally used to interpret free text for further analysis. Current approaches to NLP are typically based on deep learning, which is a type of AI that examines and uses patterns in data to improve the understanding of a program.

However, existing virtual agents applying NLU techniques to identify intent and entity matches within a search space may overextend their computational resources when attempting to infer meaning from and determine an appropriate response to a received user utterance. Indeed, during meaning searching, certain existing approaches may directly query an entire collection of stored user utterances within the search space to derive meaning for the received user utterance, thereby consuming considerable processing and memory resources over an extended time period. As such, the existing approaches may not be capable of efficiently addressing complex user utterances in a manner suitable for real-time engagement with a user and/or for simultaneously generating appropriate and timely responses to multiple user utterances.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed to an agent automation framework that is designed to extract meaning from user utterances, such as requests received by a virtual agent, and suitably respond to these user utterances. To perform these tasks, the agent automation framework includes an NLU framework and an intent-entity model having defined intents and entities that are associated with sample utterances. The NLU framework includes a meaning extraction subsystem that is designed to generate meaning representations for the sample utterances of the intent-entity model. The NLU framework thus generates a searchable understanding model or search space from the meaning representations, which each represent a different understanding or interpretation of an underlying utterance. The meaning extraction subsystem also generates a meaning representation based on an utterance received from a user, where the meaning representation is a search key to be compared to the search space. As such, a meaning search subsystem of the disclosed NLU framework is designed to search the meaning representations of the understanding model to locate meaning representation matches for the meaning representation of the received user utterance. The meaning extraction subsystem may subsequently extract intents and entities from the matching meaning representations to facilitate appropriate agent responses and/or actions.

For NLU frameworks that heavily rely on searching to extract understandings from received user utterances, such as the present meaning-search-based NLU techniques, the search process applied to large understanding models or even combinations of understanding models may evaluate substantial numbers of meaning representations, in certain cases. As such, it is presently recognized that pruning the search space to remove meaning representations that are incompatible on their surface with the meaning representation of the user utterance may enable the NLU framework to consolidate larger search spaces or more adeptly accommodate present embodiments of search spaces. For embodiments utilizing a search space generated from multiple understanding models, the techniques disclosed herein can deliver improved user satisfaction based on meaning searches that consider multiple different business aspects (e.g., sales, building information, service tickets), which are each associated with a corresponding understanding model. As discussed below, present embodiments generally improve operation of the meaning search subsystem by leveraging similarity scoring faculties to prune large search spaces to improve identification of matching meaning representations within the understanding model. In particular, the present embodiments utilize low-cost or less resource-intensive pruning criteria during earlier portions of a meaning match process to successively shrink the search space, and then apply more resource-intensive pruning criteria to the size-reduced search space. As will be understood, the present techniques thereby address the hard problem posed by NLU by transforming it into a manageable, less resource-intensive search problem that does not waste resources on evaluating meaning representations within the search space that are cursorily unrelated to a search key.

More specifically, present embodiments are directed to a similarity scoring subsystem of the meaning search subsystem for efficiently comparing meaning representations derived from the received user utterance to the meaning representations derived from the sample utterances of the intent-entity model. As will be understood, based on a progressive set of mathematical comparison functions, the similarity scoring subsystem iteratively determines a similarity score for each pair of compared meaning representations. For example, to compare a particular meaning representation to the collection of meaning representations within the understanding model, the similarity scoring subsystem may first determine a cognitive construction grammar (CCG) form for the particular meaning representation. As set forth by CCG techniques, the CCG form class membership of the particular meaning representation is set by the shape of an utterance tree structure of the particular meaning representation, as well as the part-of-speech annotation of nodes of the meaning representation. Based on the CCG form of the particular meaning representation, the similarity scoring subsystem may then query a form class database to retrieve mathematical comparison function lists that enable comparisons between the particular meaning representation and the meaning representations of the understanding model. Moreover, the similarity scoring subsystem may disregard or prune meaning representations of the understanding model that do not have a compatible CCG form to that of the particular meaning representation.

As described herein, each mathematical comparison function list includes an ordered collection of comparison functions that iteratively consider a respective number of the nodes of the meaning representations being compared. Notably, the comparison functions are ordered such that the similarity scoring subsystem implements a computationally-cheapest and/or most efficient function first, and therefore, determines an initial or preliminary similarity score between the particular meaning representation and the meaning representations of the understanding model. For example, the similarity scoring subsystem may employ an initial function to consider whether a root node of the particular meaning representation is suitably similar to a root node of each comparable meaning representation of the understanding model. The similarity scoring subsystem may then narrow in on suitably similar meaning representations, before applying a subsequent function to consider both the root node and a first dependent node of each meaning representation, or to apply any other more resource-intensive comparison function. Accordingly, iterative application of the herein-described selective node uncovering and/or application of more costly comparison functions iteratively considers more features of the compared meaning representations via increasingly-complex comparison functions, while honing in on potentially-matching meaning representation candidates of the understanding model. As such, the present techniques for predictive similarity scoring enable targeted discovery of meaning representation matches, thereby providing computational benefits to generative spaces, such as NLU, in which meaning representation size (e.g., number of nodes) and search space size may be immense.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
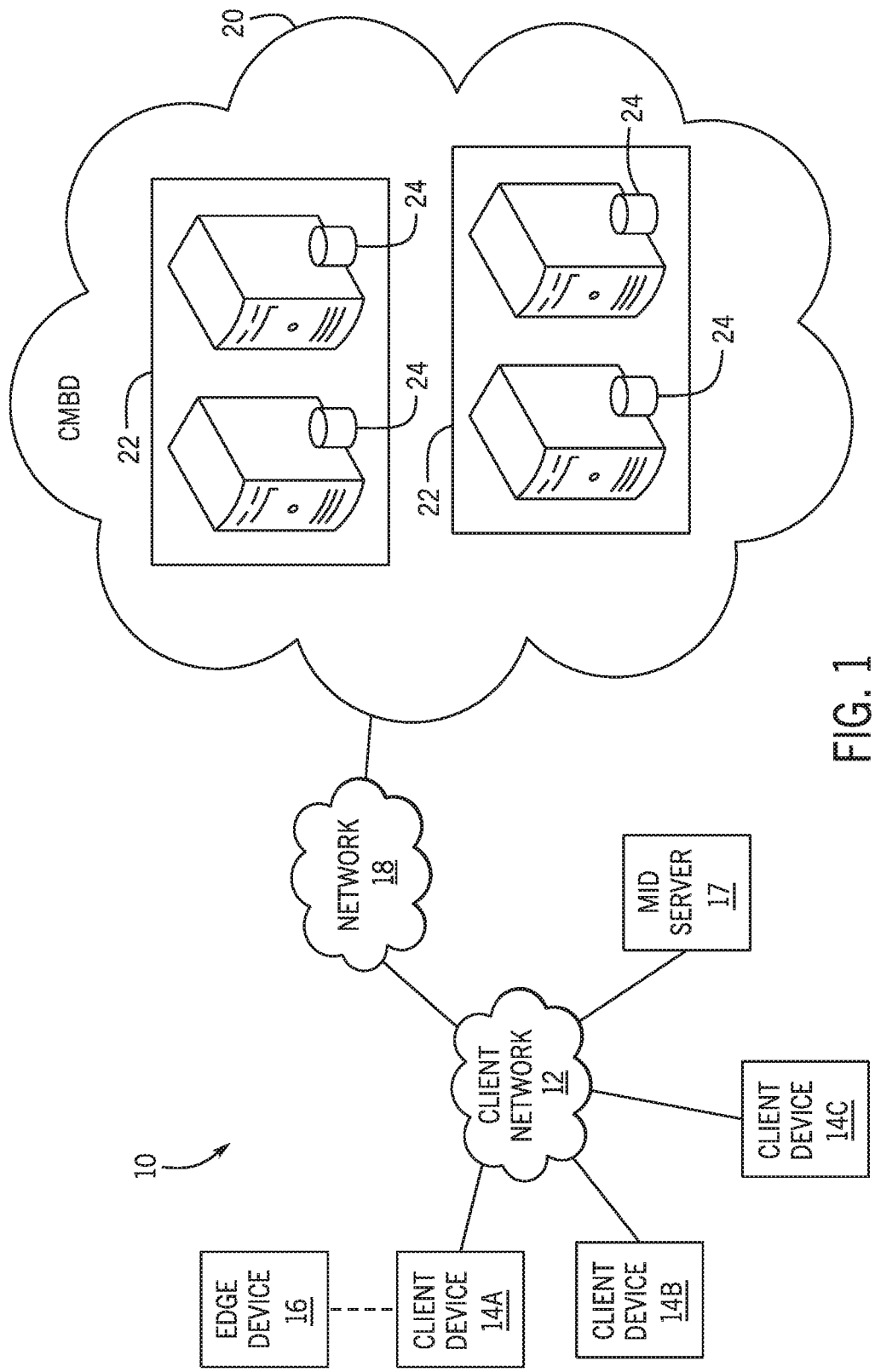
FIG. 1 is a block diagram of an embodiment of a cloud computing system in which embodiments of the present technique may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" or "computing device" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "machine-readable medium" may include a single medium or multiple media (e.g., a centralized or distributed database, and/or associated caches and servers) that store one or more instructions or data structures. The term "non-transitory machine-readable medium" shall also be taken to include any tangible medium that is capable of storing, encoding, or carrying instructions for execution by the computing system and that cause the computing system to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

As used herein, the terms "application," "engine," and "plug-in" refer to one or more sets of computer software instructions (e.g., computer programs and/or scripts) executable by one or more processors of a computing system to provide particular functionality. Computer software instructions can be written in any suitable programming languages, such as C, C++, C#, Pascal, Fortran, Perl, MATLAB, SAS, SPSS, JavaScript, AJAX, and JAVA. Such computer software instructions can comprise an independent application with data input and data display modules. Alternatively, the disclosed computer software instructions can be classes that are instantiated as distributed objects. The disclosed computer software instructions can also be component software, for example JAVABEANS or ENTERPRISE JAVABEANS. Additionally, the disclosed applications or engines can be implemented in computer software, computer hardware, or a combination thereof.

As used herein, the term "framework" refers to a system of applications and/or engines, as well as any other supporting data structures, libraries, modules, and any other supporting functionality, that cooperate to perform one or more overall functions. In particular, a "natural language understanding framework" or "NLU framework" comprises a collection of computer programs designed to process and derive meaning (e.g., intents, entities, artifacts) from natural language utterances based on an understanding model. As used herein, a "behavior engine" or "BE," also known as a reasoning agent or RA/BE, refers to a rule-based agent, such as a virtual agent, designed to interact with users based on a conversation model. For example, a "virtual agent" may refer to a particular example of a BE that is designed to interact with users via natural language requests in a particular conversational or communication channel. With this in mind, the terms "virtual agent" and "BE" are used interchangeably herein. By way of specific example, a virtual agent may be or include a chat agent that interacts with users via natural language requests and responses in a chat room environment. Other examples of virtual agents may include an email agent, a forum agent, a ticketing agent, a telephone call agent, and so forth, which interact with users in the context of email, forum posts, autoreplies to service tickets, phone calls, and so forth.

As used herein, an "intent" refers to a desire or goal of a user which may relate to an underlying purpose of a communication, such as an utterance. As used herein, an "entity" refers to an object, subject, or some other parameterization of an intent. It is noted that, for present embodiments, certain entities are treated as parameters of a corresponding intent. More specifically, certain entities (e.g., time and location) may be globally recognized and extracted for all intents, while other entities are intent-specific (e.g., merchandise entities associated with purchase intents) and are generally extracted only when found within the intents that define them. As used herein, "artifact" collectively refers to both intents and entities of an utterance. As used herein, an "understanding model" is a collection of models used by the NLU framework to infer meaning of natural language utterances. An understanding model may include a vocabulary model that associates certain tokens (e.g., words or phrases) with particular word vectors, an intent-entity model, an entity model, or a combination thereof. As used herein, an "intent-entity model" refers to a model that associates particular intents with particular sample utterances, wherein entities associated with the intent may be encoded as a parameter of the intent within the sample utterances of the model. As used herein, the term "agents" may refer to computer-generated personas (e.g. chat agents or other virtual agents) that interact with users within a conversational channel. As used herein, a "corpus" refers to a captured body of source data that includes interactions between various users and virtual agents, wherein the interactions include communications or conversations within one or more suitable types of media (e.g., a help line, a chat room or message string, an email string). As used herein, an "utterance tree" refers to a data structure that stores a meaning representation of an utterance. As discussed, an utterance tree has a tree structure (e.g., a dependency parse tree structure) that represents the syntactic and grammatical structure of the utterance (e.g., relationships between words, part-of-speech taggings), wherein nodes of the tree structure store vectors (e.g., word vectors, subtree vectors) that encode the semantic meaning of the utterance.

As used herein, "source data" or "conversation logs" may include any suitable captured interactions between various agents and users, including but not limited to, chat logs, email strings, documents, help documentation, frequently asked questions (FAQs), forum entries, items in support ticketing, recordings of help line calls, and so forth. As used herein, an "utterance" refers to a single natural language statement made by a user or agent that may include one or more intents. As such, an utterance may be part of a previously captured corpus of source data, and an utterance may also be a new statement received from a user as part of an interaction with a virtual agent. As used herein, "machine learning" or "ML" may be used to refer to any suitable statistical form of artificial intelligence capable of being trained using machine learning techniques, including supervised, unsupervised, and semi-supervised learning techniques. For example, in certain embodiments, ML techniques may be implemented using a neural network (NN) (e.g., a deep neural network (DNN), a recurrent neural network (RNN), a recursive neural network). As used herein, a "vector" (e.g., a word vector, an intent vector, a subject vector, a subtree vector) refers to a linear algebra vector that is an ordered n-dimensional list (e.g., a 300 dimensional list) of floating point values (e.g., a 1xN or an Nx1 matrix) that provides a mathematical representation of the semantic meaning of a portion (e.g., a word or phrase, an intent, an entity, a token) of an utterance. As used herein, "domain specificity" refers to how attuned a system is to correctly extracting intents and entities expressed in actual conversations in a given domain and/or conversational channel. As used herein, an "understanding" of an utterance refers to an interpretation or a construction of the utterance by the NLU framework. As such, it may be appreciated that different understandings of an utterance may be associated with different meaning representations having different structures (e.g., different nodes, different relationships between nodes), different part-of-speech taggings, and so forth.

As mentioned, a computing platform may include a chat agent, or another similar virtual agent, that is designed to automatically respond to user requests to perform functions or address issues on the platform via NLU techniques. The disclosed NLU framework is based on principles of cognitive construction grammar (CCG), in which an aspect of the meaning or understanding of a natural language utterance can be determined based on the form (e.g., syntactic structure, shape) and semantic meaning of the utterance. The disclosed NLU framework is capable of generating multiple meaning representations for an utterance, wherein each meaning representation may be an utterance tree that represents a particular understanding of the utterance. As such, the disclosed NLU framework is capable of generating an understanding model having multiple meaning representations for certain sample utterances, which expands the search space of the meaning search, thereby improving operation of the NLU framework. However, when attempting to derive user intent from natural language utterances, it is presently recognized that certain NLU frameworks may perform searches on a search space of an unduly large size due to its inclusion of meaning representations that are incomparable to and/or dissimilar from the meaning representation of the user-based utterance. As such, against the entire search space, the certain NLU frameworks may utilize an untailored or single-cost comparison function that limits performance of the meaning search with search spaces that are above a certain scale threshold based on the available processing and memory resources.

Accordingly, present embodiments are generally directed toward an agent automation framework having a meaning search subsystem designed to leverage CCG techniques to enhance meaning searching. As discussed herein, the meaning search subsystem is capable of iteratively and progressively narrowing the search space, which is explored for matching meaning representations. Indeed, these matching meaning representations define a subset of the search space that enables identification of intent or entity matches for received user utterances. More specifically, present embodiments are directed to a similarity scoring subsystem of the meaning search subsystem that efficiently compares meaning representations determined based on the received user utterance to the meaning representations of the sample utterances that define the search space. As will be understood, based on a progressive set of mathematical comparison functions, the similarity scoring subsystem iteratively determines progressively-accurate similarity scores between a pair of compared meaning representations and prunes the search space based on the various iterations of the similarity score.

For example, to compare a particular meaning representation to a collection of meaning representations defining the search space, the similarity scoring subsystem may first determine a CCG form for the particular meaning representation. As previously mentioned, the CCG form class membership of each particular meaning representation is set by the shape and semantic meanings of nodes forming a tree structure (e.g., utterance tree) of the particular meaning representation. Based on the CCG form of the particular meaning representation, the similarity scoring subsystem is designed to query a form class database to retrieve a mathematical comparison function list, which enables quantitative comparisons between respective pairs of meaning representations. Indeed, the mathematical comparison function list includes nested functions that individually specify how increasingly accurate and/or precise determinations of the similarity between respective portions of the particular meaning representation and the meaning representations of the search space may be performed. For a compared pair of meaning representations that do not have a mathematical comparison function list, the similarity scoring subsystem may prune the associated meaning representations from the search space (e.g., immediately determine a lowest possible score without performing any comparisons), conserving resource usage to remaining, potentially matching meaning representations.

In more detail, each mathematical comparison function list includes an ordered collection of comparison functions (e.g., vector algebra, cosine similarities, progressive functions, calls to other databases or structures) that consider at least a portion of the nodes of the respective meaning representations being compared. As recognized herein, the comparison functions are ordered to enable the similarity scoring subsystem to perform a computationally-cheapest and/or most efficient comparison first. The similarity scoring subsystem may determine an initial similarity score between the particular meaning representation and the comparable meaning representations remaining in the search space. For example, the similarity scoring subsystem may employ a computationally-cheapest function to consider whether a particular meaning representation is suitably similar to each meaning representation within the search space. This determination may generally provide a least accurate and most efficient prediction that indicates which regions of the search space merit further investigation. The similarity scoring subsystem may then prune non-similar meaning representations from the search space, before applying a subsequent function to further consider each remaining, comparable pair of compared meaning representations. The progressive data leveraging of the comparison functions therefore enables the similarity scoring subsystem to iteratively consider additional features of the compared meaning representations via increasingly-complex comparison functions, while narrowing the search space to potentially-matching candidates. As such, the present techniques for predictive similarity scoring enable targeted discovery of meaning representation matches, thereby providing computational benefits to improve the efficiency and reduce computational overhead for the agent automation system implementing these techniques. Additionally, because the search capacity of the agent automation system is increased, the search space may be constructed from multiple understanding models to enable natural language agent responses to address multiple different facets of the business supporting the agent automation system.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 18 (e.g., the Internet), and a cloud-based platform 20. In some implementations, the cloud-based platform 20 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14 may be computing systems and/or other types of computing devices generally referred to as Internet of Things (IoT) devices that access cloud computing services, for example, via a web browser application or via an edge device 16 that may act as a gateway between the client devices 14 and the platform 20. FIG. 1 also illustrates that the client network 12 includes an administration or managerial device, agent, or server, such as a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), IEEE 802.11 networks, and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14 via the client network 12 and network 18. The network hosting the platform 20 provides additional computing resources to the client devices 14 and/or the client network 12. For example, by utilizing the network hosting the platform 20, users of the client devices 14 are able to build and execute applications for various enterprise, IT, and/or other organization-related functions. In one embodiment, the network hosting the platform 20 is implemented on the one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server 24 can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 20, network operators may choose to configure the data centers 22 using a variety of computing infrastructures. In one embodiment, one or more of the data centers 22 are configured using a multi-tenant cloud architecture, such that one of the server instances 24 handles requests from and serves multiple customers. Data centers 22 with multi-tenant cloud architecture commingle and store data from multiple customers, where multiple customer instances are assigned to one of the virtual servers 24. In a multi-tenant cloud architecture, the particular virtual server 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 24 causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 24 and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
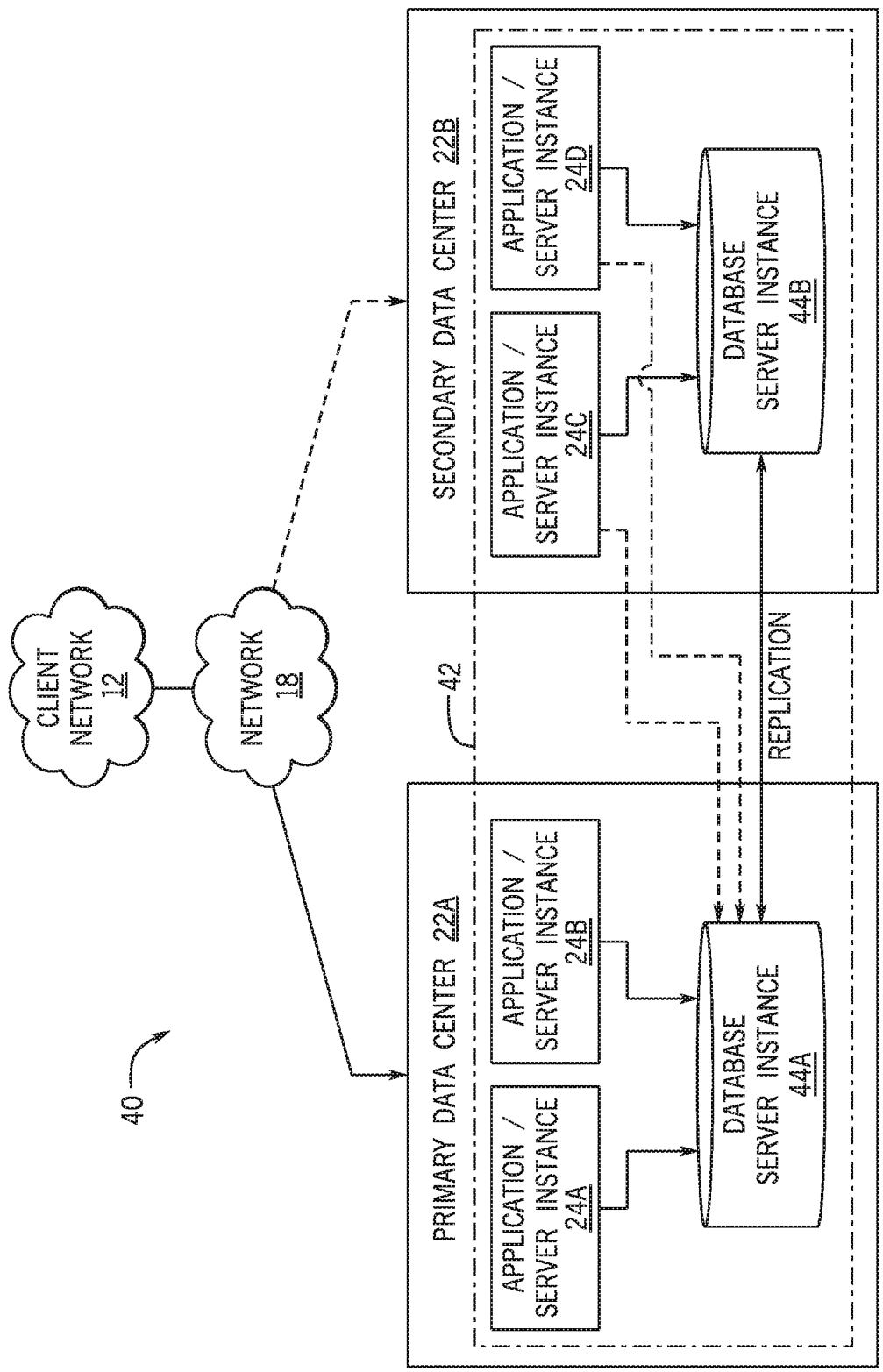
FIG. 2 is a block diagram of an embodiment of a multi-instance cloud architecture in which embodiments of the present technique may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. In the depicted example, to facilitate availability of the client instance 42, the virtual servers 24A-24D and virtual database servers 44A and 44B are allocated to two different data centers 22A and 22B so that one of the data centers 22 acts as a backup data center. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 24A, 24B, 24C, 24D and virtual database servers 44A, 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
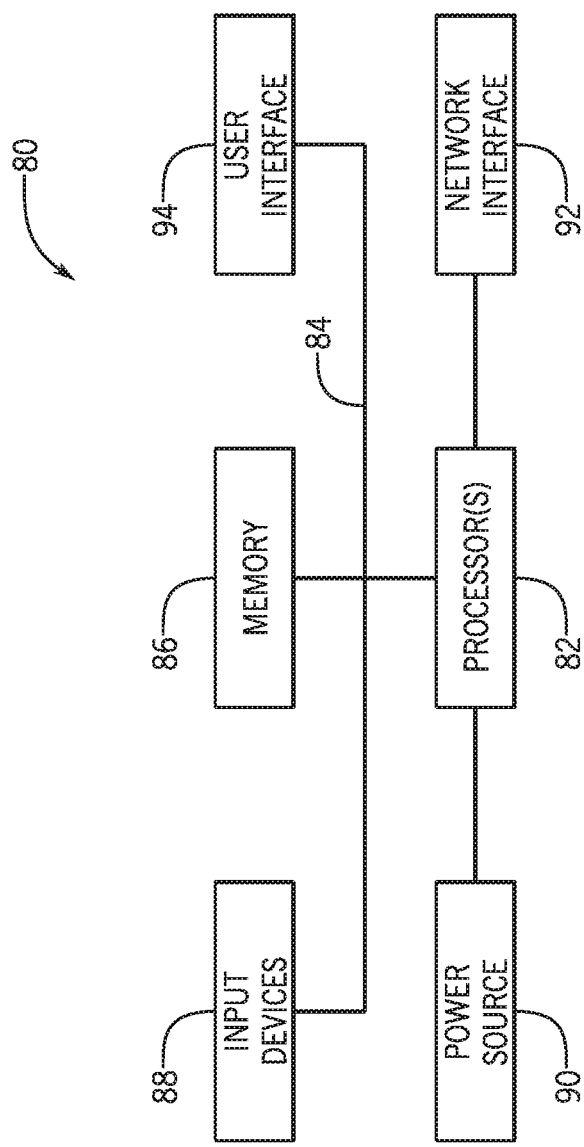
FIG. 3 is a block diagram of a computing device utilized in a computing system that may be present in FIG. 1 or 2, in accordance with aspects of the present technique.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 include suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processors 82. For example, the input devices 88 may include a mouse, touchpad, touchscreen, keyboard and the like. The power source 90 can be any suitable source for power of the various components of the computing device 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

It should be appreciated that the cloud-based platform 20 discussed above provides an example of an architecture that may utilize NLU technologies. In particular, the cloud-based platform 20 may include or store a large corpus of source data that can be mined, to facilitate the generation of a number of outputs, including an intent-entity model. For example, the cloud-based platform 20 may include ticketing source data having requests for changes or repairs to particular systems, dialog between the requester and a service technician or an administrator attempting to address an issue, a description of how the ticket was eventually resolved, and so forth. Then, the generated intent-entity model can serve as a basis for classifying intents in future requests, and can be used to generate and improve a conversational model to support a virtual agent that can automatically address future issues within the cloud-based platform 20 based on natural language requests from users. As such, in certain embodiments described herein, the disclosed agent automation framework is incorporated into the cloud-based platform 20, while in other embodiments, the agent automation framework may be hosted and executed (separately from the cloud-based platform 20) by a suitable system that is communicatively coupled to the cloud-based platform 20 to process utterances, as discussed below.

Figure 4A:
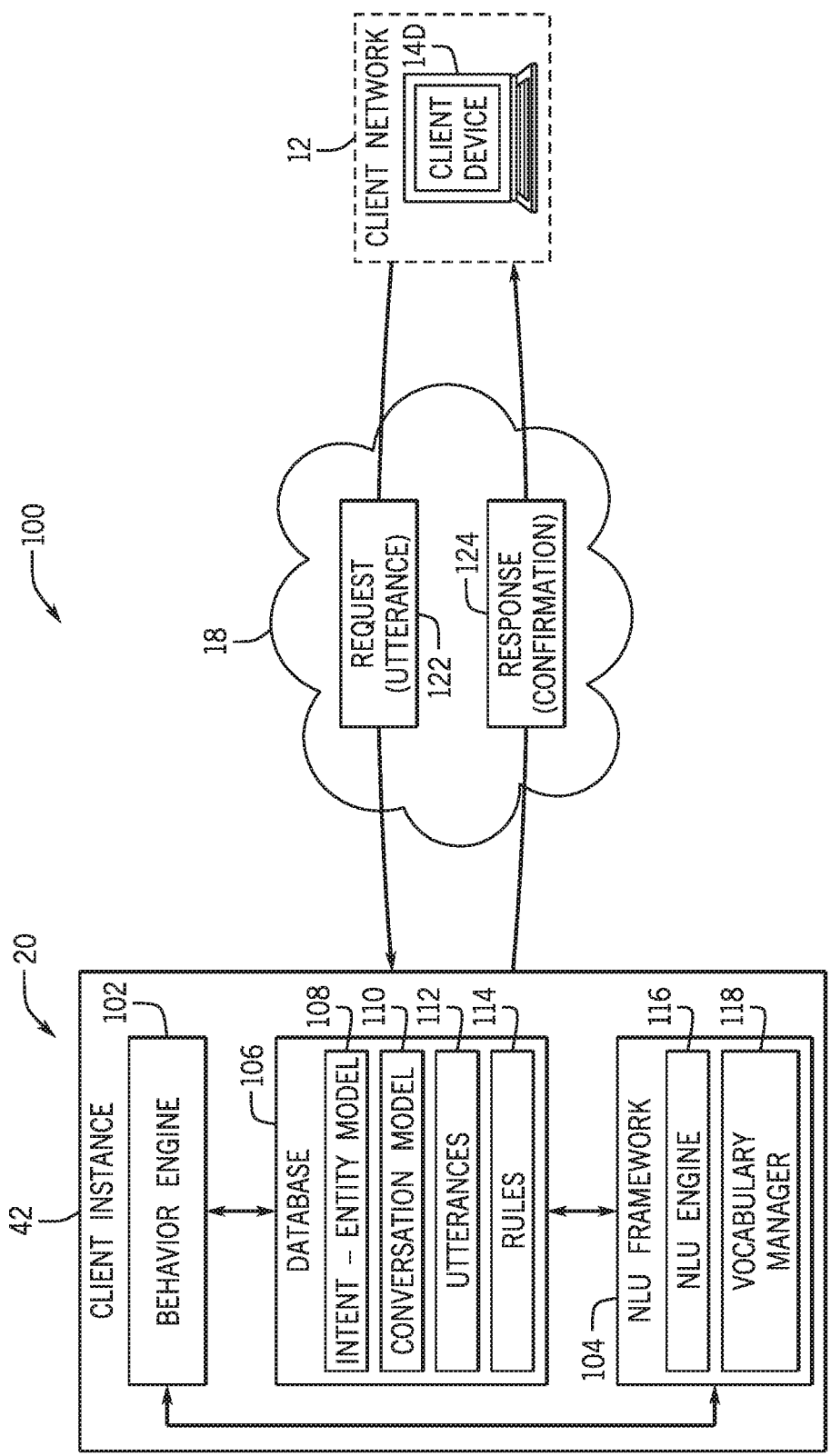
FIG. 4A is a schematic diagram illustrating an embodiment of an agent automation framework including an NLU framework that is part of a client instance hosted by the cloud computing system, in accordance with aspects of the present technique.

With the foregoing in mind, FIG. 4A illustrates an agent automation framework 100 (also referred to herein as an agent automation system 100) associated with a client instance 42. More specifically, FIG. 4A illustrates an example of a portion of a service provider cloud infrastructure, including the cloud-based platform 20 discussed above. The cloud-based platform 20 is connected to a client device 14D via the network 18 to provide a user interface to network applications executing within the client instance 42 (e.g., via a web browser of the client device 14D). Client instance 42 is supported by virtual servers similar to those explained with respect to FIG. 2, and is illustrated here to show support for the disclosed functionality described herein within the client instance 42. The cloud provider infrastructure is generally configured to support a plurality of end-user devices, such as client device 14D, concurrently, wherein each end-user device is in communication with the single client instance 42. Also, the cloud provider infrastructure may be configured to support any number of client instances, such as client instance 42, concurrently, with each of the instances in communication with one or more end-user devices. As mentioned above, an end-user may also interface with client instance 42 using an application that is executed within a web browser.

The embodiment of the agent automation framework 100 illustrated in FIG. 4A includes a behavior engine (BE) 102, an NLU framework 104, and a database 106, which are communicatively coupled within the client instance 42. The BE 102 may host or include any suitable number of virtual agents or personas that interact with the user of the client device 14D via natural language user requests 122 (also referred to herein as user utterances 122 or utterances 122) and agent responses 124 (also referred to herein as agent utterances 124). It may be noted that, in actual implementations, the agent automation framework 100 may include a number of other suitable components, including the meaning extraction subsystem, the meaning search subsystem, and so forth, in accordance with the present disclosure.

For the embodiment illustrated in FIG. 4A, the database 106 may be a database server instance (e.g., database server instance 44A or 44B, as discussed with respect to FIG. 2), or a collection of database server instances. The illustrated database 106 stores an intent-entity model 108, a conversation model 110, a corpus of utterances 112, and a collection of rules 114 in one or more tables (e.g., relational database tables) of the database 106. The intent-entity model 108 stores associations or relationships between particular intents and particular entities via particular sample utterances. In certain embodiments, the intent-entity model 108 may be authored by a designer using a suitable authoring tool. In other embodiments, the agent automation framework 100 generates the intent-entity model 108 from the corpus of utterances 112 and the collection of rules 114 stored in one or more tables of the database 106. The intent-entity model 108 may also be determined based on a combination of authored and ML techniques, in some embodiments. In any case, it should be understood that the disclosed intent-entity model 108 may associate any suitable combination of intents and/or entities with respective ones of the corpus of utterances 112. For embodiments discussed below, sample utterances of the intent-entity model 108 are used to generate meaning representations of an understanding model to define the search space for a meaning search.

For the embodiment illustrated in FIG. 4A, the conversation model 110 stores associations between intents of the intent-entity model 108 and particular responses and/or actions, which generally define the behavior of the BE 102. In certain embodiments, at least a portion of the associations within the conversation model are manually created or predefined by a designer of the BE 102 based on how the designer wants the BE 102 to respond to particular identified artifacts in processed utterances. It should be noted that, in different embodiments, the database 106 may include other database tables storing other information related to intent classification, such as a tables storing information regarding compilation model template data (e.g., class compatibility rules, class-level scoring coefficients, tree-model comparison algorithms, tree substructure vectorization algorithms), meaning representations, and so forth.

For the illustrated embodiment, the NLU framework 104 includes an NLU engine 116 and a vocabulary manager 118. It may be appreciated that the NLU framework 104 may include any suitable number of other components. In certain embodiments, the NLU engine 116 is designed to perform a number of functions of the NLU framework 104, including generating word vectors (e.g., intent vectors, subject or entity vectors, subtree vectors) from word or phrases of utterances, as well as determining distances (e.g., Euclidean distances) between these vectors. For example, the NLU engine 116 is generally capable of producing a respective intent vector for each intent of an analyzed utterance. As such, a similarity measure or distance between two different utterances can be calculated using the respective intent vectors produced by the NLU engine 116 for the two intents, wherein the similarity measure provides an indication of similarity in meaning between the two intents.

The vocabulary manager 118 addresses out-of-vocabulary words and symbols that were not encountered by the NLU framework 104 during vocabulary training. For example, in certain embodiments, the vocabulary manager 118 can identify and replace synonyms and domain-specific meanings of words and acronyms within utterances analyzed by the agent automation framework 100 (e.g., based on the collection of rules 114), which can improve the performance of the NLU framework 104 to properly identify intents and entities within context-specific utterances. Additionally, to accommodate the tendency of natural language to adopt new usages for pre-existing words, in certain embodiments, the vocabulary manager 118 handles repurposing of words previously associated with other intents or entities based on a change in context. For example, the vocabulary manager 118 could handle a situation in which, in the context of utterances from a particular client instance and/or conversation channel, the word "bike" actually refers to a motorcycle rather than a bicycle.

Once the intent-entity model 108 and the conversation model 110 have been created, the agent automation framework 100 is designed to receive a user utterance 122 (in the form of a natural language request) and to appropriately take action to address the request. For example, for the embodiment illustrated in FIG. 4A, the BE 102 is a virtual agent that receives, via the network 18, the utterance 122 (e.g., a natural language request in a chat communication) submitted by the client device 14D disposed on the client network 12. The BE 102 provides the utterance 122 to the NLU framework 104, and the NLU engine 116, along with the various subsystems of the NLU framework discussed below, processes the utterance 122 based on the intent-entity model 108 to derive artifacts (e.g., intents and/or entities) within the utterance. Based on the artifacts derived by the NLU engine 116, as well as the associations within the conversation model 110, the BE 102 performs one or more particular predefined actions. For the illustrated embodiment, the BE 102 also provides a response 124 (e.g., a virtual agent utterance 124 or confirmation) to the client device 14D via the network 18, for example, indicating actions performed by the BE 102 in response to the received user utterance 122. Additionally, in certain embodiments, the utterance 122 may be added to the utterances 112 stored in the database 106 for continued learning within the NLU framework 104.

It may be appreciated that, in other embodiments, one or more components of the agent automation framework 100 and/or the NLU framework 104 may be otherwise arranged, situated, or hosted for improved performance. For example, in certain embodiments, one or more portions of the NLU framework 104 may be hosted by an instance (e.g., a shared instance, an enterprise instance) that is separate from, and communicatively coupled to, the client instance 42. It is presently recognized that such embodiments can advantageously reduce the size of the client instance 42, improving the efficiency of the cloud-based platform 20. In particular, in certain embodiments, one or more components of the similarity scoring subsystem discussed below may be hosted by a separate instance (e.g., an enterprise instance) that is communicatively coupled to the client instance 42, as well as other client instances, to enable improved meaning searching for suitable matching meaning representations within the search space to enable identification of artifact matches for the utterance 122.

Figure 4B:
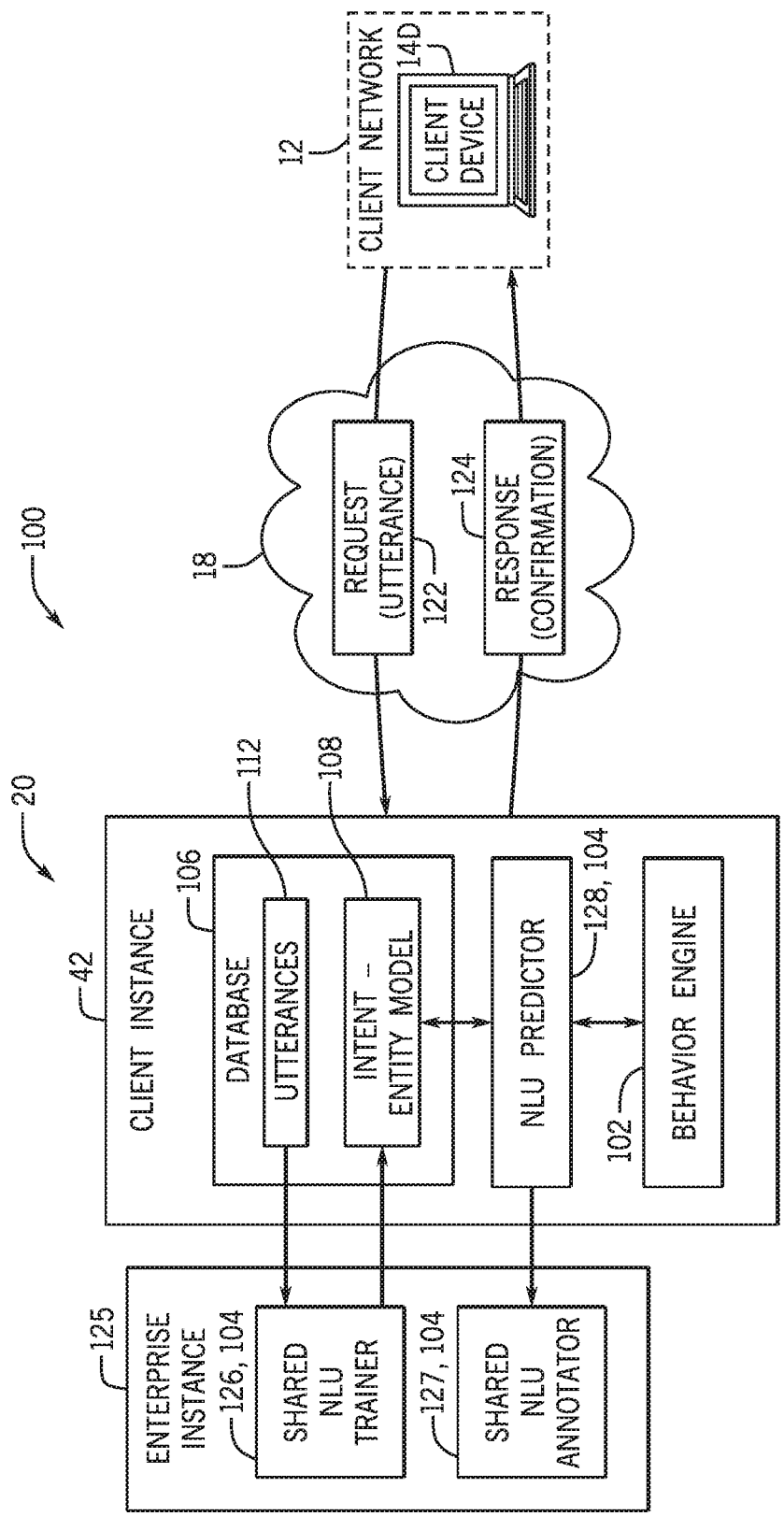
FIG. 4B is a schematic diagram illustrating an alternative embodiment of the agent automation framework in which portions of the NLU framework are part of an enterprise instance hosted by the cloud computing system, in accordance with aspects of the present technique.

With the foregoing in mind, FIG. 4B illustrates an alternative embodiment of the agent automation framework 100 in which portions of the NLU framework 104 are instead executed by a separate, shared instance (e.g., enterprise instance 125) that is hosted by the cloud-based platform 20. The illustrated enterprise instance 125 is communicatively coupled to exchange data related to artifact mining and classification with any suitable number of client instances via a suitable protocol (e.g., via suitable Representational State Transfer (REST) requests/responses). As such, for the design illustrated in FIG. 4B, by hosting a portion of the NLU framework as a shared resource accessible to multiple client instances 42, the size of the client instance 42 can be substantially reduced (e.g., compared to the embodiment of the agent automation framework 100 illustrated in FIG. 4A) and the overall efficiency of the agent automation framework 100 can be improved.

In particular, the NLU framework 104 illustrated in FIG. 4B is divided into three distinct components that perform distinct processes within the NLU framework 104. These components include: a shared NLU trainer 126 hosted by the enterprise instance 125, a shared NLU annotator 127 hosted by the enterprise instance 125, and an NLU predictor 128 hosted by the client instance 42. It may be appreciated that the organizations illustrated in FIGS. 4A and 4B are merely examples, and in other embodiments, other organizations of the NLU framework 104 and/or the agent automation framework 100 may be used, in accordance with the present disclosure.

For the embodiment of the agent automation framework 100 illustrated in FIG. 4B, the shared NLU trainer 126 is designed to receive the corpus of utterances 112 from the client instance 42, and to perform semantic mining (e.g., including semantic parsing, grammar engineering, and so forth) to facilitate generation of the intent-entity model 108. Once the intent-entity model 108 has been generated, when the BE 102 receives the user utterance 122 provided by the client device 14D, the NLU predictor 128 passes the utterance 122 and the intent-entity model 108 to the shared NLU annotator 127 for parsing and annotation of the utterance 122. The shared NLU annotator 127 performs semantic parsing, grammar engineering, and so forth, of the utterance 122 based on the intent-entity model 108 and returns annotated utterance trees of the utterance 122 to the NLU predictor 128 of client instance 42. The NLU predictor 128 then uses these annotated structures of the utterance 122, discussed below in greater detail, to identify matching intents from the intent-entity model 108, such that the BE 102 can perform one or more actions based on the identified intents. It may be appreciated that the shared NLU annotator 127 may correspond to the meaning extraction subsystem 150, and the NLU predictor may correspond to the meaning search subsystem 152, of the NLU framework 104, as discussed below.

Figure 5:
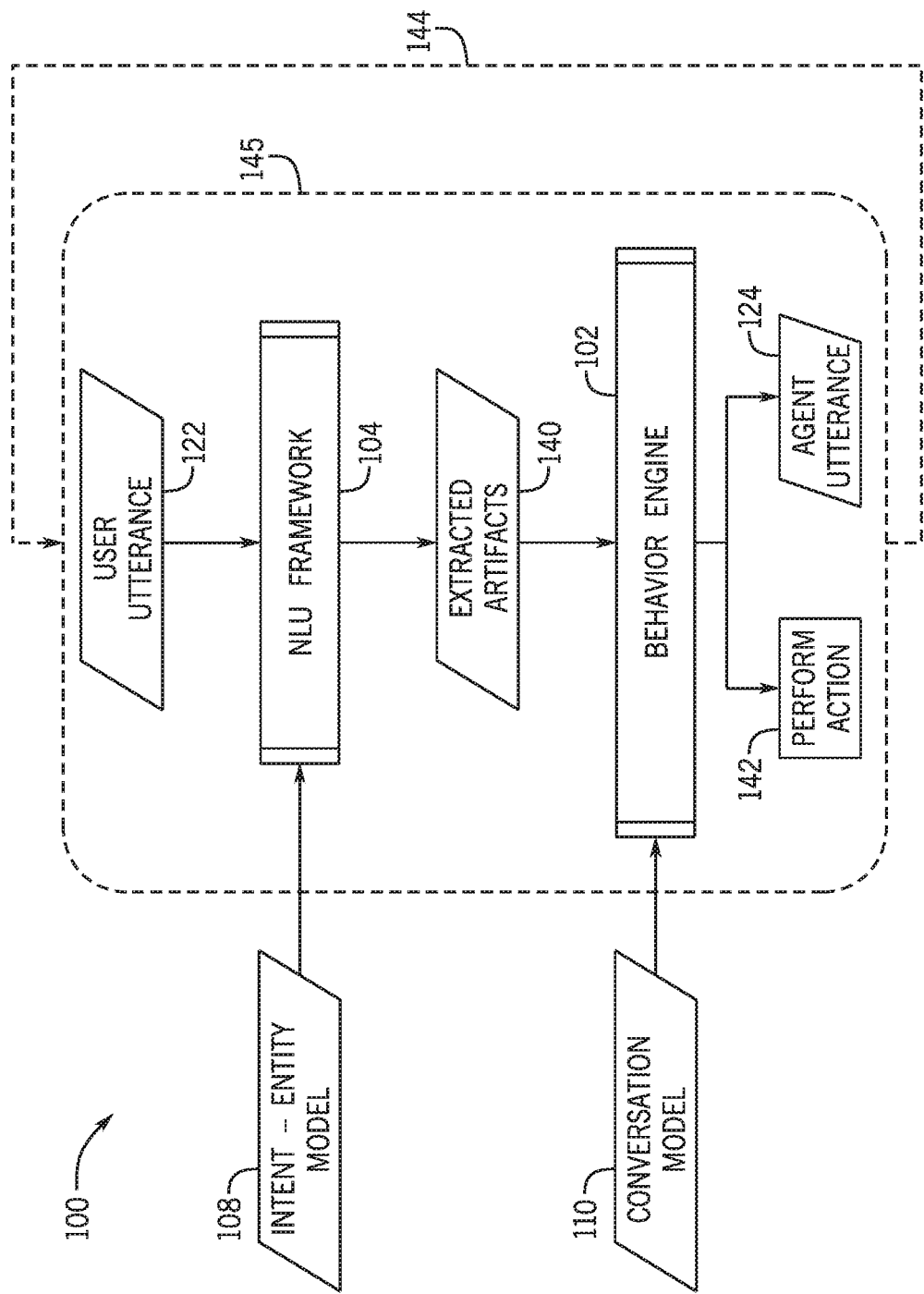
FIG. 5 is a flow diagram illustrating an embodiment of a process by which an agent automation framework, including an NLU framework and a Behavior Engine framework, extracts intents and/or entities from and responds to a user utterance, in accordance with aspects of the present technique.

FIG. 5 is a flow diagram depicting a process 145 by which the behavior engine (BE) 102 and NLU framework 104 perform respective roles within an embodiment of the agent automation framework 100. For the illustrated embodiment, the NLU framework 104 processes a received user utterance 122 to extract artifacts 140 (e.g., intents and/or entities) based on the intent-entity model 108. The extracted artifacts 140 may be implemented as a collection of symbols that represent intents and entities of the user utterance 122 in a form that is consumable by the BE 102. As such, these extracted artifacts 140 are provided to the BE 102, which processes the received artifacts 140 based on the conversation model 110 to determine suitable actions 142 (e.g., changing a password, creating a record, purchasing an item, closing an account) and/or virtual agent utterances 124 in response to the received user utterance 122. As indicated by the arrow 144, the process 145 can continuously repeat as the agent automation framework 100 receives and addresses additional user utterances 122 from the same user and/or other users in a conversational format.

As illustrated in FIG. 5, it may be appreciated that, in certain situations, no further action or communications may occur once the suitable actions 142 have been performed. Additionally, it should be noted that, while the user utterance 122 and the agent utterance 124 are discussed herein as being conveyed using a written conversational medium or channel (e.g., chat, email, ticketing system, text messages, forum posts), in other embodiments, voice-to-text and/or text-to-voice modules or plugins could be included to translate spoken user utterance 122 into text and/or translate text-based agent utterance 124 into speech to enable a voice interactive system, in accordance with the present disclosure. Furthermore, in certain embodiments, both the user utterance 122 and the virtual agent utterance 124 may be stored in the database 106 (e.g., in the corpus of utterances 112) to enable continued learning of new structure and vocabulary within the agent automation framework 100.

Figure 6:
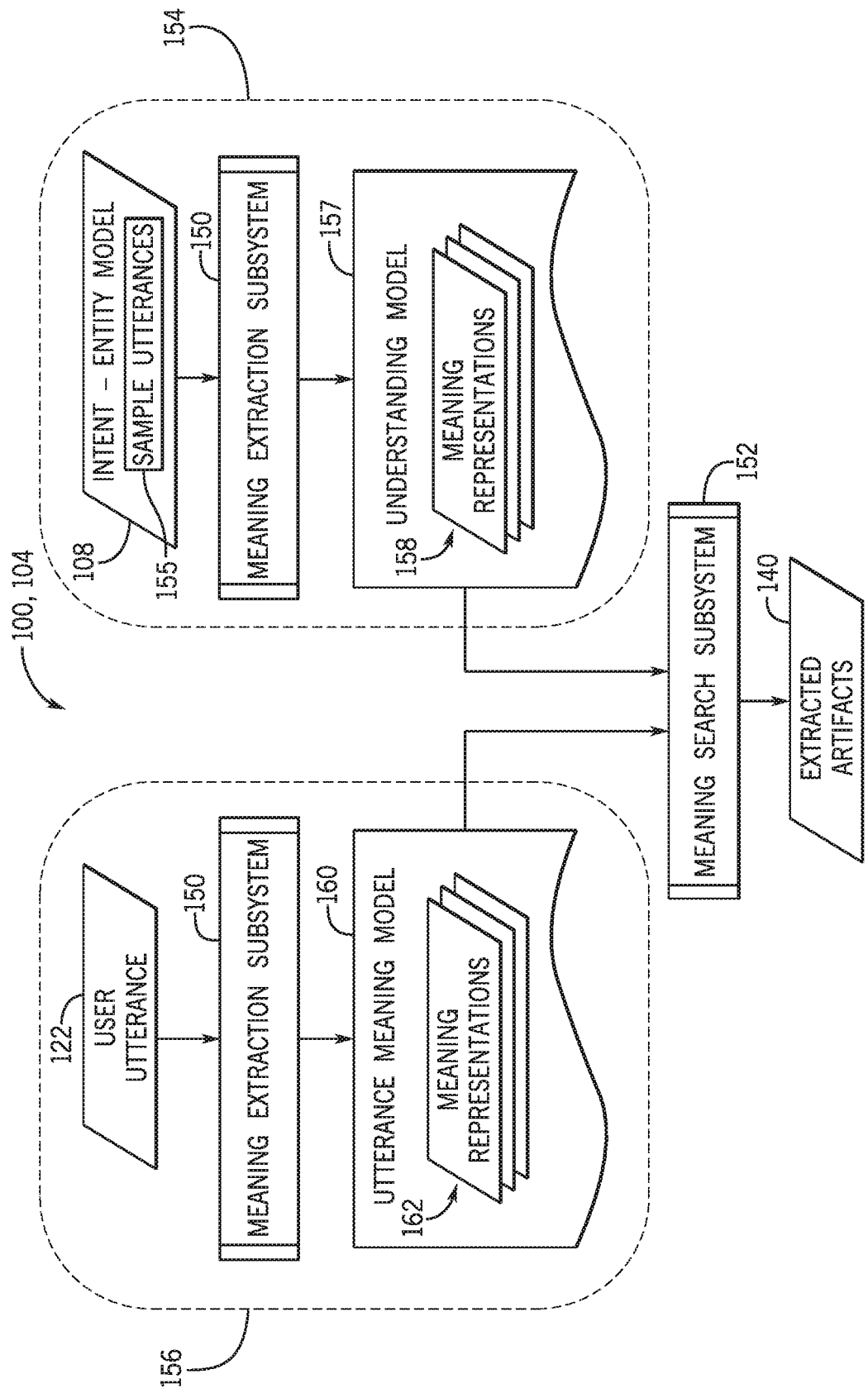
FIG. 6 is a block diagram illustrating an embodiment of the NLU framework including a meaning extraction subsystem and a meaning search subsystem, wherein the meaning extraction subsystem generates meaning representations from a received user utterance to yield an utterance meaning model and generates meaning representations from sample utterances of an understanding model to yield understanding model, and wherein the meaning search subsystem compares meaning representations of the utterance meaning model to meaning representations of the understanding model to extract artifacts (e.g., intents and entities) from the received user utterance, in accordance with aspects of the present technique.

As mentioned, the NLU framework 104 includes two primary subsystems that cooperate to convert the hard problem of NLU into a manageable search problem—namely: a meaning extraction subsystem and a meaning search subsystem. For example, FIG. 6 is a block diagram illustrating roles of the meaning extraction subsystem 150 and the meaning search subsystem 152 of the NLU framework 104 within an embodiment of the agent automation framework 100. For the illustrated embodiment, a right-hand portion 154 of FIG. 6 illustrates the meaning extraction subsystem 150 of the NLU framework 104 receiving the intent-entity model 108, which includes sample utterances 155 for each of the various artifacts of the model. The meaning extraction subsystem 150 generates an understanding model 157 that includes meaning representations 158 (e.g., utterance tree structures) of the sample utterances 155 of the intent-entity model 108. In other words, the understanding model 157 is a translated or augmented version of the intent-entity model 108 that includes meaning representations 158 to enable searching (e.g., comparison and matching) by the meaning search subsystem 152, as discussed in more detail below. As such, it may be appreciated that the right-hand portion 154 of FIG. 6 is generally performed in advance of receiving the user utterance 122, such as on a routine, scheduled basis or in response to updates to the intent-entity model 108.

For the embodiment illustrated in FIG. 6, a left-hand portion 156 illustrates the meaning extraction subsystem 150 also receiving and processing the user utterance 122 to generate an utterance meaning model 160 having at least one meaning representation 162. As discussed in greater detail below, these meaning representations 158 and 162 are data structures having a form that captures the grammatical, syntactic structure of one understanding of an utterance, wherein subtrees of the data structures include subtree vectors that encode the semantic meanings of portions of the utterance. As such, for a given utterance, a corresponding meaning representation captures both syntactic and semantic meaning in a common meaning representation format that enables searching, comparison, and matching by the meaning search subsystem 152, as discussed in greater detail below. Accordingly, the meaning representations 162 of the utterance meaning model 160 can be generally thought of like a search key, while the meaning representations 158 of the understanding model 157 define a search space in which the search key can be sought. Thus, the meaning search subsystem 152 searches the meaning representations 158 of the understanding model 157 to locate one or more artifacts that match the meaning representation 162 of the utterance meaning model 160 as discussed below, thereby generating the extracted artifacts 140.

Figure 7:
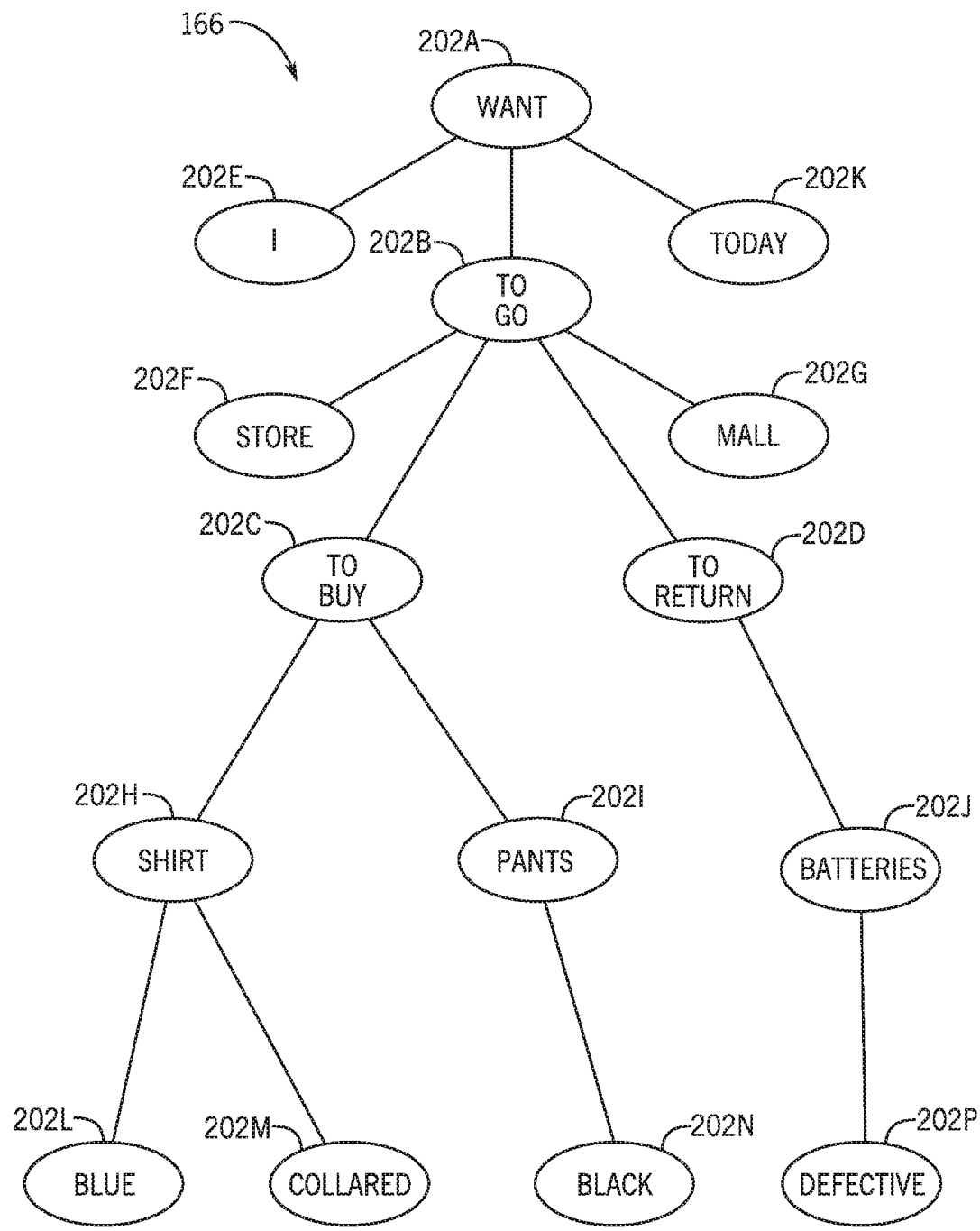
FIG. 7 is a diagram illustrating an example of an utterance tree generated for an utterance, in accordance with an embodiment of the present approach.

As an example of one of the meaning representations 158, 162 disclosed herein, FIG. 7 is a diagram illustrating an example of an utterance tree 166 generated for an utterance. As should be understood, the utterance tree 166 is a data structure that is generated by the meaning extraction subsystem 150 based on the user utterance 122, or alternatively, based on one of the sample utterances 155. For the example illustrated in FIG. 7, the utterance tree 166 is based on an example utterance, "I want to go to the store by the mall today to buy a blue, collared shirt and black pants and also to return some defective batteries." The illustrated utterance tree 166 includes a set of nodes 202 (e.g., nodes 202A, 202B, 202C, 202D, 202E, 202F, 202G, 202H, 202I, 202J, 202K, 202L, 202M, 202N, and 202P) arranged in a tree structure, with each node representing a particular word or phrase of the example utterance. It may be noted that each of the nodes 202 may also be described as representing a particular subtree of the utterance tree 166, wherein a subtree can include one or more nodes 202.

The form or shape of the utterance tree 166 illustrated in FIG. 7 is determined by the meaning extraction subsystem 150 and represents the syntactic, grammatical meaning of the example utterance. More specifically, a prosody subsystem of the meaning extraction subsystem 150 breaks the utterance into intent segments, while a structure subsystem of the meaning extraction subsystem 150 constructs the utterance tree 166 from these intent segments. Each of the nodes 202 store or reference a respective word vector (e.g., token) that is determined by the vocabulary subsystem to indicate the semantic meaning of the particular word or phase of the utterance. As mentioned, each word vector is an ordered n-dimensional list (e.g., a 300 dimensional list) of floating point values (e.g., a 1×N or an N×1 matrix) that provides a mathematical representation of the semantic meaning of a portion of an utterance.

Moreover, in other embodiments, each of the nodes 202 may be annotated by the structure subsystem with additional information about the word or phrase represented by the node to form an annotated embodiment of the utterance tree 166. For example, each of the nodes 202 may include a respective tag, identifier, shading, or cross-hatching that is indicative of a class annotation of the respective node. In particular, for the example utterance tree 166 illustrated in FIG. 7, certain subtrees or nodes (e.g., nodes 202A, 202B, 202C, and 202D) may be annotated with part-of-speech labels or tags to be verb nodes, certain subtrees or nodes (e.g., nodes 202E, 202F, 202G, 202H, 202I, and 202J) may be annotated to be subject or object nodes, and certain subtrees or nodes (e.g., nodes 202K, 202L, 202M, 202N, and 202P) may be annotated to be modifier nodes (e.g., subject modifier nodes, object modifier nodes, verb modifier nodes) by the structure subsystem. These class annotations may then be used by the meaning search subsystem 152 when comparing meaning representations that are generated from annotated utterance trees. As such, it may be appreciated that the utterance tree 166, from which the meaning representations are generated, serves as a basis (e.g., an initial basis) for artifact extraction.

Figure 8:
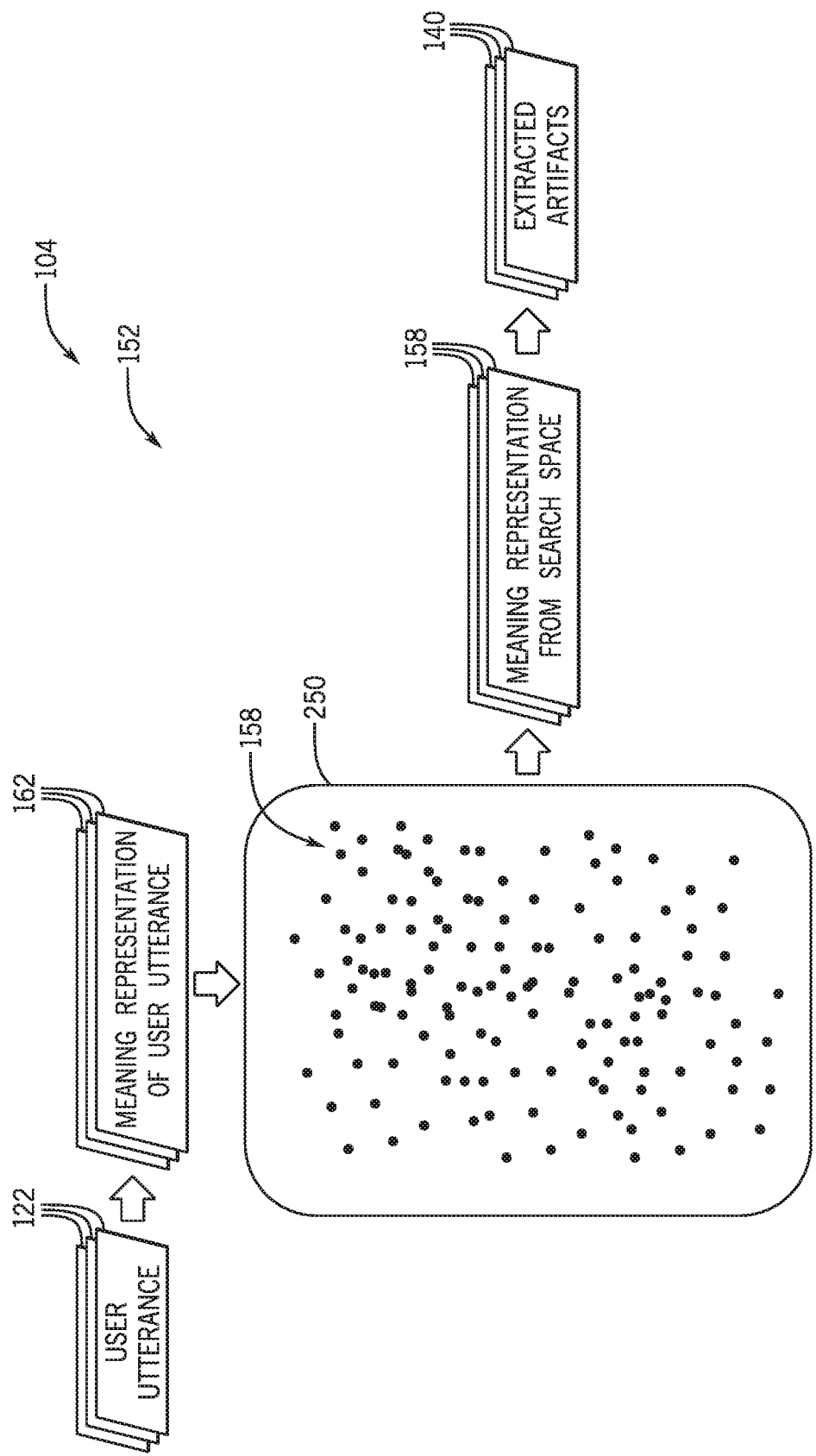
FIG. 8 is an information flow diagram illustrating an embodiment of the meaning search subsystem analyzing a search space defined by the understanding model to determine or identify matching meaning representations that enable the NLU framework to extract artifacts from the received user utterance, in accordance with aspects of the present technique.

As acknowledged herein, to facilitate generation of the extracted artifacts 140, the meaning search subsystem 152 may determine a similarity between any two or more meaning representations, such as one or more of the meaning representations 162 of the utterance meaning model 160 and one or more of the meaning representations 158 of the understanding model 157. For example, FIG. 8 is an information flow diagram illustrating an embodiment of the meaning search subsystem 152 operating within a search space 250. As previously mentioned, the search space 250 of the present embodiment is populated with and defined by the meaning representations 158 of the understanding model 157. In other embodiments, the NLU framework 104 may generate the search space 250 based on uncovering of the meaning representations 158 produced by multiple understanding models, such as understanding models that are each suited for a particular context or domain. Thus, after user utterances 122 are received and segmented into potential artifacts (e.g., by a prosody subsystem) and translated into respective meaning representations 162 (e.g., by the meaning extraction subsystem 150), the meaning search subsystem 152 compares the meaning representations 162 of the user utterances 122 to the meaning representations 158 of the search space 250. Indeed, as discussed in more detail below, the meaning search subsystem 152 may identify any suitable, matching meaning representations 158 from the search space 250 to enable the NLU framework 104 to identify the extracted artifacts 140 therefrom.

In some embodiments, the meaning search subsystem 152 identifies one or multiple meaning representations 158 as a suitable match for each one of the meaning representations 162 of the user utterance 122. For example, in response to receiving three meaning representations 162 corresponding to one or more user utterances 122, the meaning search subsystem 152 of certain embodiments returns one or more matching meaning representations 158 of the search space 250, provided that a meaning representation match can be found. The meaning search subsystem 152 may also score the matching meaning representations 158 and/or the artifacts therein with an accompanying confidence level to facilitate appropriate agent responses 124 and/or actions 142 to the most likely extracted artifacts 140 from the meaning representations 158.

As recognized herein, the meaning search subsystem 152 may utilize a predictive similarity scoring scheme to progressively render a more accurate similarity score between the meaning representations 158 and 162 to facilitate targeted pruning of the meaning representations 158 and determination of the extracted artifacts 140. In such embodiments, the predictive similarity scoring scheme enables performance of searches on large-scale manifestations of the search space 250, such as those generated based on the meaning representations 158 of multiple or extensive understanding models 157. Generally, a similarity scoring subsystem of the meaning search subsystem 152 operates by first identifying mathematical comparison function lists that enable comparison between a particular, utterance-based meaning representation 162 and each meaning representation 158 within the search space 250 (e.g., search-space meaning representation). For meaning representations 158 that do not have a comparable form to the meaning representation 162, the similarity scoring subsystem may identify the meaning representations 158 as incompatible and prune them from the search space 250. Then, the similarity scoring subsystem implements the respective mathematical comparison function lists by applying a broadest or least-expensive function therein to generate an initial similarity score between the particular meaning representation 162 and the remaining, comparable meaning representations 158 of the search space 250. As discussed below, the meaning search subsystem 152 may progress to utilizing more computationally-expensive functions (e.g., functions that consider additional nodes, functions that consider additional dimensions of the same number of nodes, functions that query databases such as dictionaries or external language models) as the search space 250 is pruned of meaning representations 158 that are not suitably similar to the particular meaning representation 162. The meaning search subsystem 152 therefore systematically narrows in on suitable meaning representations 158 that provide the extracted artifacts 140.

Figure 9:
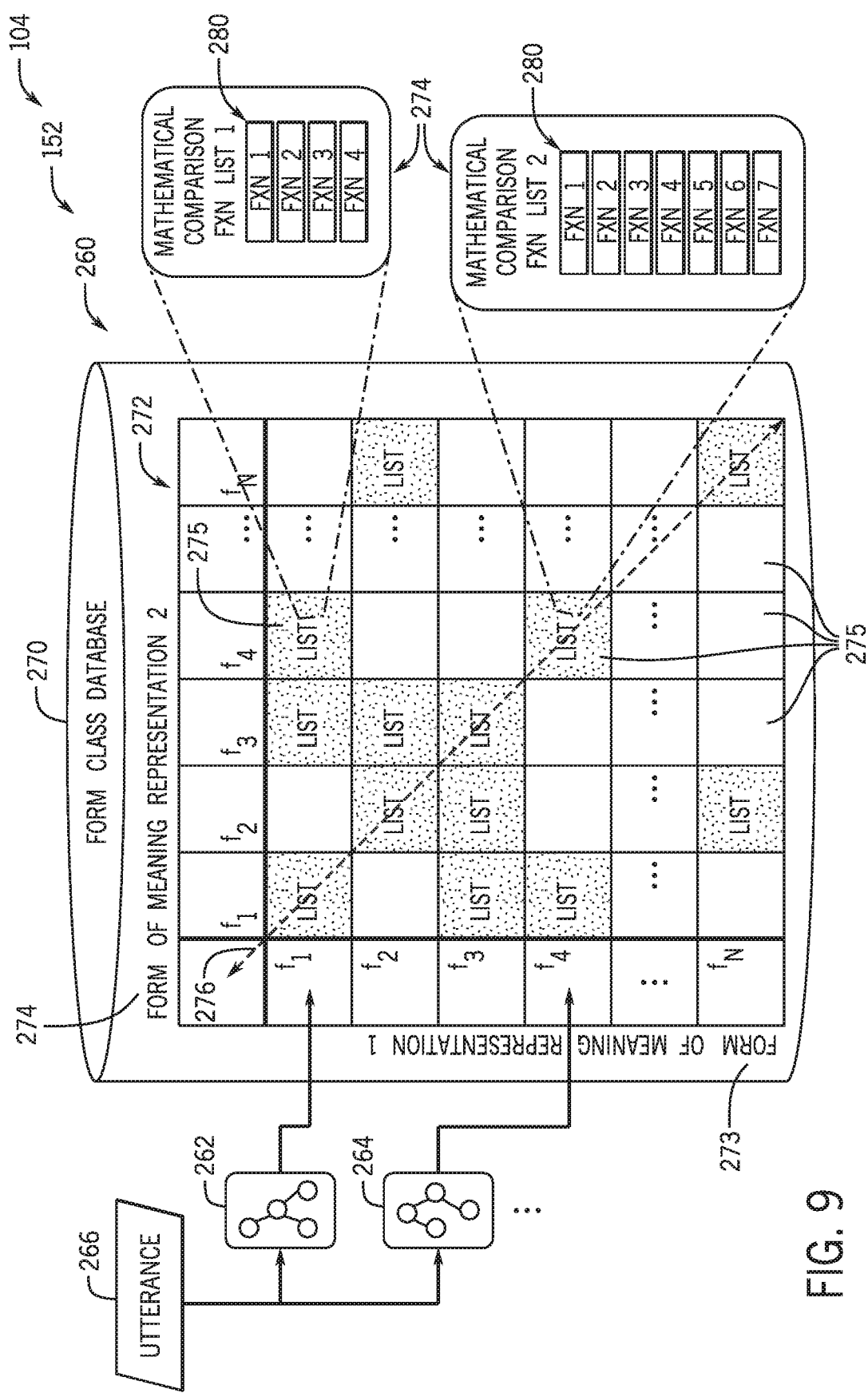
FIG. 9 is an information flow diagram illustrating an embodiment of a similarity scoring subsystem that may be implemented within the meaning search subsystem of the NLU framework to retrieve mathematical comparison function lists that enable efficient comparisons between any suitable number of meaning representations, in accordance with aspects of the present technique.

By way of example, FIG. 9 is an information flow diagram illustrating an embodiment of a similarity scoring subsystem 260 that may be implemented within the meaning search subsystem 152 of the NLU framework 104. As discussed below, the similarity scoring subsystem 260 retrieves and utilizes mathematical comparison functions to iteratively compare any suitable number of meaning representations to one another via more and more expensive functions. As an example, the present embodiment of FIG. 9 is directed to functionalities of the similarity scoring subsystem 260 by which a first meaning representation 262 and a second meaning representation 264 are compared to the meaning representations 158 of the search space 250, but it should be understood that the below-discussed techniques are applicable to each meaning representation of the NLU framework 104. As will be understood, the first meaning representation 262 may correspond to a first one of the meaning representations 162 discussed above, and the second meaning representation 164 may correspond to a second one of the meaning representations 162. The meaning representations 262, 264 may each be derived from an utterance 266 that is primarily discussed herein as corresponding to the user utterance 122, but may correspond to one of the sample utterances 155 discussed above, in other embodiments.

Generally, each meaning representation 262, 264 belongs to zero, one, or multiple cognitive construction grammar (CCG) form classes, which are assigned based on the shape (e.g., utterance tree structure and part-of-speech tagging) of the meaning representation 262, 264. In other words, based on CCG techniques, the similarity scoring subsystem 260 recognizes that each meaning representation 262, 264 has a shape or structure (e.g., defined by an utterance tree or other suitable meta-structure) including part-of-speech tags for nodes (e.g., word vectors and/or combinations of word vectors) that are collectively mappable to CCG forms. The similarity scoring subsystem 260 may therefore perform searches based on the shapes of the meaning representations 262, 264 to identify suitable matching meaning representations 158 that include artifact matches for the meaning representations 262, 264.

In the illustrated embodiment, the similarity scoring subsystem 260 includes a form class database 270, which contains a form class table 272 therein. Although primarily discussed as a table, the form class table 272 may be embodied in any suitable data structure, in other embodiments. In some embodiments, the form class database 270 and the form class table 272 may be stored within the database 106 of the agent automation framework 100. As recognized herein, each entry 275 (e.g., form class entry) of the form class table 272 describes a one-to-one form class comparison (also referred to as a CCG form class comparison) supported by the meaning search subsystem 152. In particular, the form class table 272 includes a first axis 273 associated with a CCG form of a first meaning representation and a second axis 274 associated with a CCG form of a second meaning representation being compared. Each axis label is associated with a form pattern for each of the respective CCG forms that the similarity scoring subsystem 260 supports, such as a verb-led phrase, a noun-led phrase, and so forth, and is represented by a suitable function identifier within a supported CCG form range of $f_1$-$f_N$. Thus, it should be understood that the form pattern for a particular meaning representation defines CCG form class membership for the particular meaning representation.

In the present embodiment, the form class table 272 includes a respective one of the entries 275 for each intersection of two of the CCG forms to indicate whether the two associated CCG forms are comparable, and if so, instructions regarding performance of the comparison. It should be understood that the form class table 272 may include any suitable number of entries 275 that correspond to each possible permutation of compared CCG form classes. Notably, meaning representations that each belong to the same CCG form class are per se comparable to one another, represented by a below-discussed comparison function list that is indicated within each entry 275 along a central diagonal 276 of the form class table 272. As presently illustrated, the form class table 272 has a line of reflection symmetry along the central diagonal 276, indicating that the comparison functionalities of the present embodiment of the form class table 272 are commutative. That is, comparing a first meaning representation to a second meaning representation yields the same result as comparing the second meaning representation to the first meaning representation. In other embodiments, the form class table 272 may not include the line of reflection symmetry, thus enabling the similarity scoring subsystem 260 to tailor the below-discussed comparison function list based on an order or direction in which meaning representations are being compared. As a particular example, one entry 275 of the form class table 272 may specify that a meaning representation having a verb-led CCG form may be compared to other meaning representations having a verb-led CCG form, a noun-led CCG form, and so forth. In present embodiments, the similarity scoring subsystem 260 determines that a pair of meaning representations is not comparable in response to determining that the entry 275 for the comparison is empty (e.g., null, undefined), and thus, does not perform comparisons between the incomparable meaning representations.

As mentioned, the entry 275 of the form class table 272 for each supported CCG form class comparison of the similarity scoring subsystem 260 also includes, or directs the similarity scoring subsystem 260 to, a mathematical comparison function list 278 (e.g., form-algebra function list, processing rules) with one or multiple functions 280 (e.g., comparison functions). The functions 280 of each mathematical comparison function list 278 are a set of nested functions that provide progressively more expensive scoring functionalities that enable each one of the meaning representations 262, 264 to be compared to the search space 250, as described in more detail below. The mathematical comparison function list 278 may include vector algebra, cosine similarity functions, queries to external databases, and/or any other suitable mathematical functions or formulas that the similarity scoring subsystem 260 may employ to determine similarity scores between any suitable number of meaning representations. It should be understood that the functions 280 may further define a previous function of the mathematical comparison function list 278, or alternatively, be completely independent from the previous functions 280. In some embodiments, the mathematical comparison function list 278 for each entry 275 of the form class table 272 is manually specified by linguists or users, derived by ML techniques, and so forth.

Generally, the functions 280 of the mathematical comparison function list 278 each respectively score the similarity between comparable ones of the meaning representations 262, 264 and the search space 250 by imparting a similarity score that is above a particular threshold score in response to considered portions of the meaning representations 262, 264 suitably matching meaning representations 158 of the search space 250. In certain embodiments, the functions 280 may assign zeros to, or otherwise penalize, the similarity score associated with respective meaning representations 158 of the search space 250, in response to the respective meaning representations 158 excluding or not matching important or significant nodes of the corresponding, search-key meaning representation 262, 264. As will be understood, the similarity scoring subsystem 260 does not compare a meaning representation to another meaning representation having a CCG form unsuitable for comparison based on the form class compatibility rules of the form class database 270, as denoted by empty entries 275 of the form class table 272.

In other embodiments, the similarity scoring subsystem may immediately assign a similarity score of zero to incomparable pairs of meaning representations, in some embodiments. In further embodiments, the similarity scoring subsystem 260 may perform the comparison by implementing a mathematical comparison function list 278 with functions 280 that cause the similarity scoring subsystem 260 to generate a similarity score of zero between the non-comparable meaning representations. In such embodiments, because the mathematical comparison function lists 278 may naturally cause the similarity scoring subsystem 260 to assign zero or null similarity scores to meaning representations 158 having CCG forms unsuitable for comparison to the meaning representations 262, 264, the form class table 272 may include the appropriate mathematical comparison function list 278 in each entry 275 of the form class table 272.

Moreover, in certain embodiments, the similarity scoring subsystem 260 may receive representations of multiple expressions of the utterance 266 from the utterance meaning model 160. For example, the meaning representations 262, 264 may be included within the utterance meaning model 160 as representing alternative forms for the utterance 266. Generally, each of the meaning representations 262, 264 (produced by the meaning extraction subsystem 150 and included in the utterance meaning model 160) represents a suitably distinct meaning representation that corresponds to the artifacts of utterance 266. By considering each comparable pair of the meaning representations 262, 264, the similarity scoring subsystem 260 of the present embodiment may evaluate multiple interpretations of the utterance 266 to provide more thorough searching for, or to cast a larger net for, corresponding extracted artifacts 140.

Turning briefly to FIG. 6 to discuss a specific example, the meaning extraction subsystem 150 of certain embodiments may determine that the utterance 266 "Book meeting" has a first alternative meaning representation corresponding to "request booking or scheduling a meeting" and a second alternative meaning representation corresponding to "a meeting about a book." The meaning extraction subsystem 150 may then incorporate these alternative meaning representations within the utterance meaning model 160. By propagating both of these alternative meaning representations to later steps of the similarity scoring process via the meaning search subsystem 152, the similarity scoring subsystem 260 is more likely to identify a suitable mathematical comparison function list 278 that enables identification of suitable extracted artifacts 140.

Figure 10:
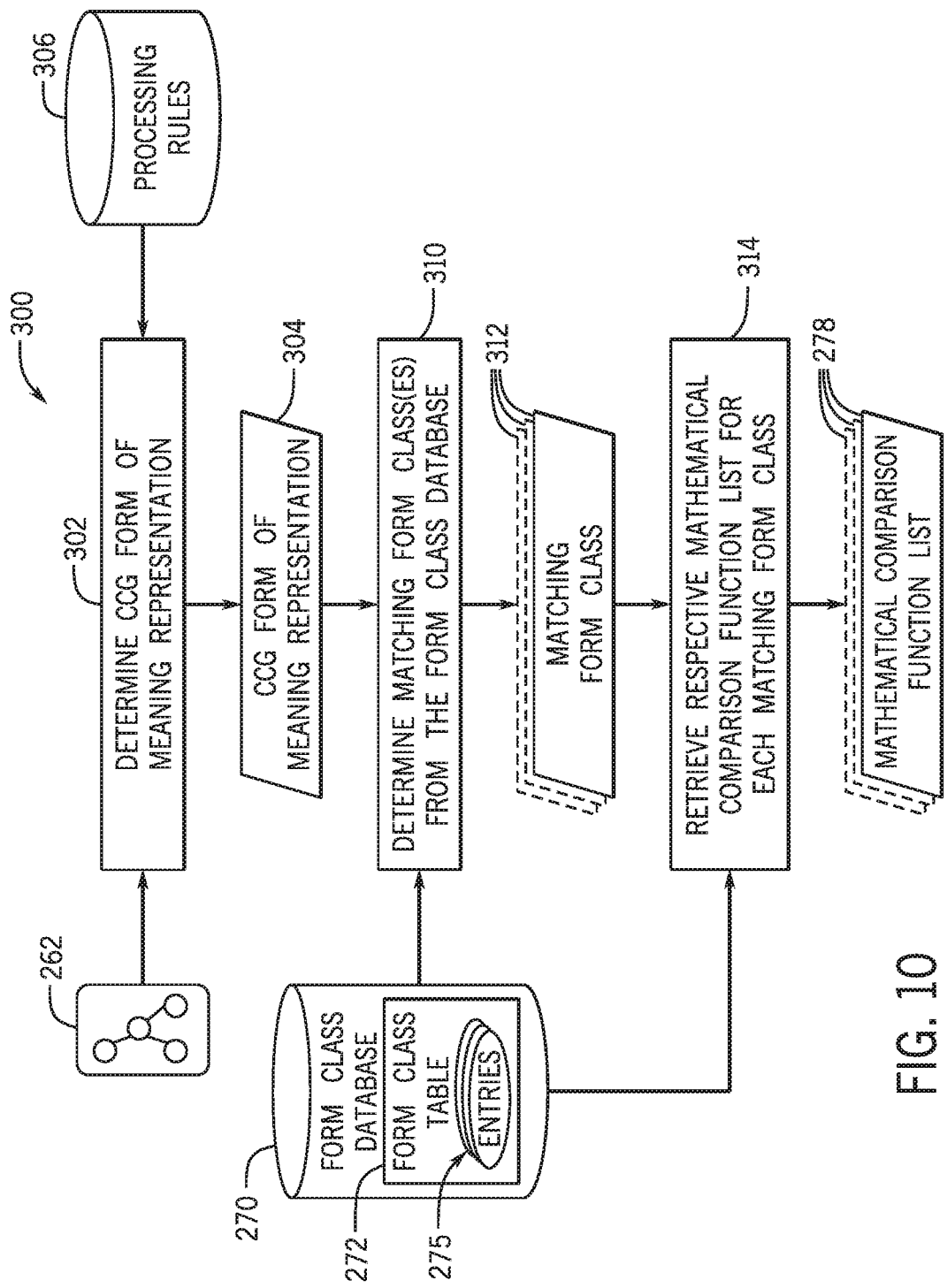
FIG. 10 is a flow diagram illustrating an embodiment of a process by which the similarity scoring subsystem retrieves the mathematical comparison function lists that enable comparison between the utterance-based meaning representation and the search space of FIG. 8, in accordance with aspects of the present technique.

With the above description of components of the similarity scoring subsystem 260 in mind, FIG. 10 is a flow diagram illustrating an embodiment of a process 300 by which the similarity scoring subsystem 260 retrieves one of the mathematical comparison function lists 278 that enable comparison between the first meaning representation 262 of FIG. 9 and the meaning representations 158 of the search space 250 of FIG. 8. It should be understood that the process 300 may be repeated or separately processed in parallel for each utterance-based meaning representation 162 considered by the similarity scoring subsystem 260 of the meaning search subsystem 152. As discussed above, the meaning search subsystem 152, which includes the similarity scoring subsystem 260 therein, may receive the meaning representation 262 for the utterance 266 from the utterance meaning model 160 that is defined by the meaning extraction subsystem 150. The similarity scoring subsystem 260 may retrieve the meaning representation 262 directly from the meaning extraction subsystem 150, in other embodiments. The steps that are illustrated and/or described as part of the meaning extraction subsystem 150 may be stored in suitable memory (e.g., memory 86) and executed by suitable a suitable processor (e.g., processor 82) associated with the client instance 42 (e.g., within the data center 22) or the enterprise instance 125 (e.g., hosted by the cloud-based platform 20).

As such, the similarity scoring subsystem 260 beginning the illustrated embodiment of the process 300 determines (block 302) a CCG form 304 (e.g., cognitive construction grammar form) of the meaning representation 262. As mentioned above, the CCG form 304 may be any suitable description of the shape formed by nodes of the meaning representation 262, analyzed with respect to the part-of-speech annotations or tagging of tokens (e.g., words or phrases) within the nodes. For example, the similarity scoring subsystem 260 may identify that the meaning representation 262 has a CCG form 304 that corresponds to a verb-pronoun-noun phrase, a noun-verb-direct object phrase, a noun-verb-adverb phrase, etc.

In the present embodiment, the similarity scoring subsystem 260 determines the CCG form 304 for the meaning representation 262 by applying a set of processing rules 306 (e.g., form processing rules) and assigning the CCG form 304 to the meaning representation 262 based on its correspondence to the set of processing rules 306. In other embodiments, the similarity scoring subsystem 260 may determine the CCG form 304 via any other suitable manner, such as by receiving the CCG form 304 from the meaning extraction subsystem 150 or by ML-based pattern matching techniques. As an example of ML-based pattern matching, the similarity scoring subsystem 260 may determine a suitable or closest-matching CCG form 304 for the meaning representation 262 by comparing the shape, having part-of-speech tags, of the meaning representation 262 to the meaning representations 158 of the understanding model 157 to identify similarities therebetween. As should be understood, the similarity scoring subsystem 260 may include any suitable plug-in or other processing components that enable determination of the CCG form 304 of the meaning representation 262.

With the CCG form 304 for the meaning representation 262 identified, the similarity scoring subsystem 260 then determines (block 310) zero, one, or multiple matching form classes 312 to the CCG form 304 from the form class database 270. The matching form classes 312 may be identified by pattern matching, by querying table-type embodiments of the form class database 270, and so forth. More particularly, the similarity scoring subsystem 260 of present embodiments locates the corresponding entries 275 within the form class table 272 having mathematical comparison function lists 278 therein, thereby determining to which form classes the meaning representation 262 may be compared. Indeed, as noted above, each entry 275 of the form class table 272 for the particular CCG form 304 may include one of the mathematical comparison function lists 278 for each CCG form that may be compared to the CCG form 304 of the meaning representation 262 (e.g., form class compatibility), as well as a set of functions 280 by which the similarity may be computed.

Thus, the similarity scoring subsystem 260 following the process 300 retrieves (block 314) a respective mathematical comparison function list 278 from each entry 275 of the form class table 272 indicative of an identified match between the CCG form 304 of the meaning representation 262 and the CCG form of the other meaning representation associated with the respective entry 275 (e.g., each matching form class 312). In the present embodiment, the similarity scoring subsystem 260 identifies one matching form class 312 and outputs one mathematical comparison function list 278, though it should be understood that any other suitable number of mathematical comparison function lists 278 may be retrieved, depending on the number of form class matches. For example, the similarity scoring subsystem 260 may retrieve a first mathematical comparison function list 278 dictating how to compare the meaning representation 262 to a meaning representation having the same CCG form 304, as well as a second mathematical comparison function list 278 enabling comparison between the meaning representation 262 and another meaning representation having a different CCG form 304.

Figure 11:
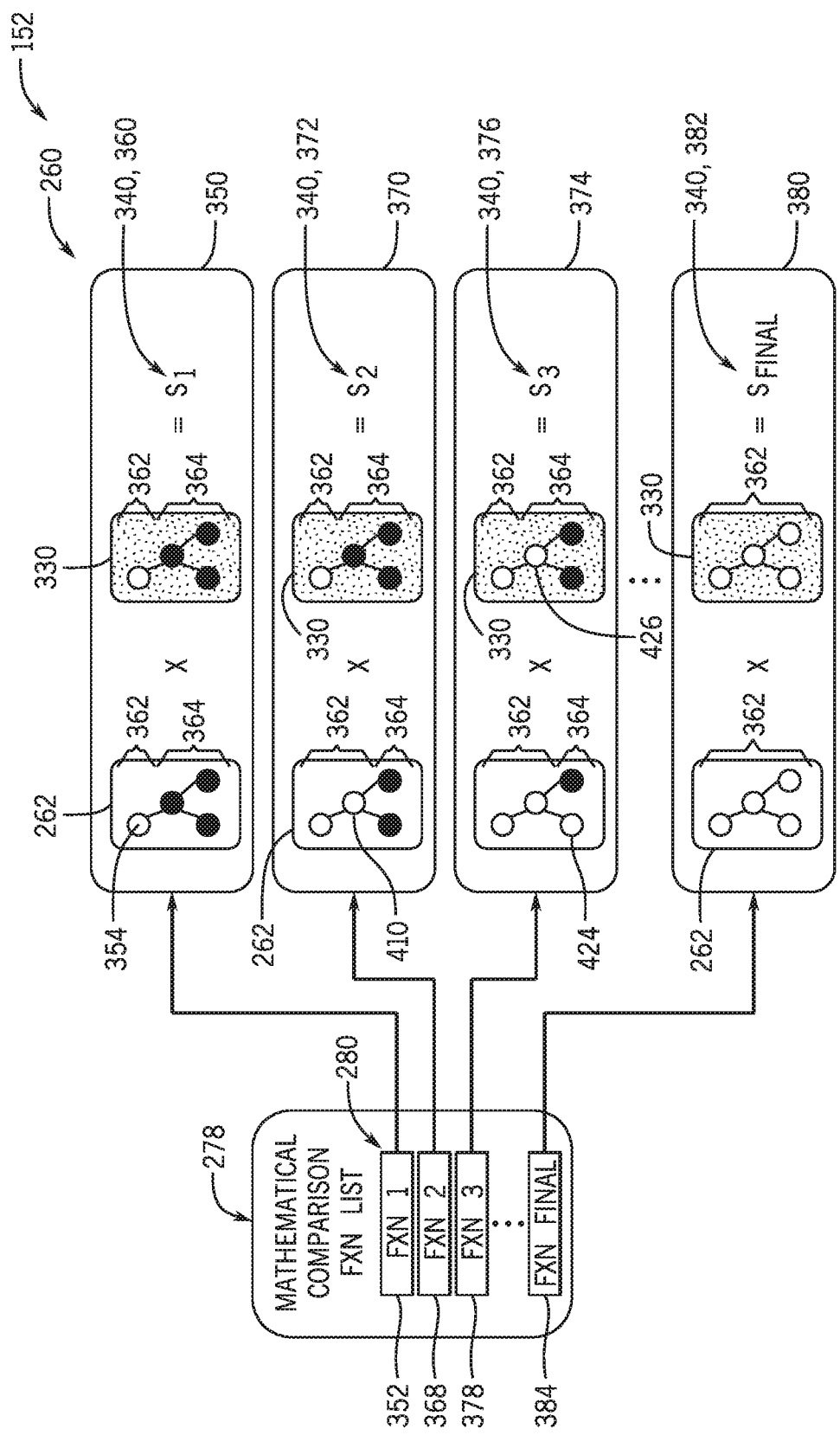
FIG. 11 is a diagram of an embodiment of the similarity scoring subsystem of the meaning search subsystem utilizing one mathematical comparison function list to compare a first meaning representation to a second meaning representation, in accordance with aspects of the present technique.

To illustrate use of the mathematical comparison function list 278, FIG. 11 is a diagram of an embodiment of the similarity scoring subsystem 260 of the meaning search subsystem 152 utilizing one mathematical comparison function list 278 to compare the meaning representation 262 to a search-space meaning representation 330 (e.g., of the search space 250). In the present embodiment, the search-space meaning representation 330 is one of the meaning representations 158 of the search space 250, though it should be understood that the present techniques may be utilized to compare any suitable meaning representations. As previously noted, the mathematical comparison function list 278 includes an ordered set of functions 280 that progressively utilize more computational resources and/or data (e.g., a greater number of nodes) from the compared meaning representations 262, 330 within functions 280 positioned deeper within the mathematical comparison function list 278. As recognized herein, the mathematical comparison function list 278 is ordered with less computationally-expensive functions 280 first, progressing to leverage more expensive functions as the potential meaning representations 158 to be included the search space 250 are pruned. As such, the similarity scoring subsystem 260 generally determines more accurate similarity scores 340 (e.g., predictive similarity scores) via subsequently-utilized and more expensive functions 280.

For example, during a first comparison 350, the similarity scoring subsystem 260 may implement a first function 352 to compare a root node 354 of the meaning representation 262 to a search-space root node 356 of the search-space meaning representation 330. As previously noted, the first function 352 is the least expensive function 280 of the mathematical comparison function list 278. The similarity scoring subsystem 260 may then determine a first similarity score 360 that describes a topical (e.g., low-depth, cheapest to compute) similarity between the meaning representations 262, 330. It should be understood that the root nodes 354, 356 are examples of the portions of the meaning representations 262, 330 compared via the first function 352, as other portions, including an entirety of each meaning representation 262, 330 may be compared in the first comparison 350, given that the first function 352 is the least expensive function 352 of the mathematical comparison function list 278. The similarity scores 340 may be any suitable mathematical representation of similarity or correspondence between the form including part-of-speech tags for the two meaning representations, such as a value assigned within a similarity scoring range of zero to one, zero to five, zero to ten, and so forth. It should be understood that the similarity scores 340 described herein are distinct from the above-discussed similarity measures determined between two intent vectors, at least because the similarity scores 340 describe comprehensive meaning-and-form based similarity between considered portions of two meaning representations.

In the present embodiment of FIG. 11, the root nodes 354, 356 evaluated during the first comparison 350 are illustrated as hollow circles. As shown with solid circles, remaining, dependent nodes of the meaning representations 262, 330 are effectively "covered" (e.g., not considered) during the first comparison 350. Extending this methodology to the subsequent comparisons discussed below, the nodes illustrated as the hollow circles in a respective comparison are evaluated in the respective comparison (e.g., considered nodes 362), while the nodes illustrated as the solid circles are not evaluated (non-considered nodes 364).

Generally, the similarity scoring subsystem 260 leverages the order of the functions 280 from least to most expensive to enable the more extensive and computationally-expensive comparisons positioned later within the mathematical comparison function list 278 to be performed on a focused portion of the search space 250. In some embodiments, the similarity scoring subsystem 260 may selectively "uncover" (e.g., consider) more nodes of the meaning representations 262, 330 as the similarity scoring subsystem 260 progresses through subsequent comparisons.

For example, after determining the first similarity score 360, the similarity scoring subsystem 260 of the present embodiment proceeds with implementing a second function 368 within a second comparison 370 that generates a more accurate second similarity score 372 based on an increased number of considered nodes 362. Then, the similarity scoring subsystem 260 performs a third comparison 374 that generates a further accurate third similarity score 376 via a third function 378 that considers a same number of nodes and is more expensive, by virtue of considering a greater number of dimensions of the word vectors associated with the considered nodes 362, consulting an external database, or any other suitable functions or operations. The similarity scoring subsystem 260 subsequently performs a final comparison 380 that generates a most accurate final similarity score 382 via a fourth function 384, which may generally be the most expensive function 280 utilized. More details regarding the illustrative comparisons 350, 370, 374, 380 between the meaning representations 262, 330 are provided below.

Moreover, although not illustrated, it should be understood that the similarity scoring subsystem 260 may implement weights or coefficients (e.g., derived from ML-techniques) within the comparisons to adjust the various part-of-speech contributions to the similarity score in a context-dependent manner. For example, for processing search engine requests, the similarity scoring subsystem 260 may increase the contribution of modifiers relative to nouns or verbs. Alternatively, during purchase order requests provided to a chatbot embodiment of the NLU framework 104, the similarity scoring subsystem 260 may increase the contribution of nouns relative to modifiers or verbs. In some embodiments, the similarity scoring subsystem 260 learns the weights from the meaning representations 158 within the NLU framework 104 during operation, and thus, may develop to be more discourse specific over time.

As recognized herein, the similarity scoring subsystem 260 of certain embodiments may also analyze the similarity between two meaning representations having different sizes by comparing suitable combinations of subtree vectors of the meaning representations. For example, the similarity scoring subsystem 260 may determine a combination (e.g., centroid or weighted average) for a subtree vector of the nodes of a longer meaning representation that do not have a comparable counterpart in a shorter meaning representation. The similarity scoring subsystem 260 of these embodiments may therefore analyze a modified meaning representation (including the comparison in place of the incomparable nodes) to the shorter meaning representation, according to the present techniques.

In certain embodiments, the similarity scoring subsystem 260 may apply particular, interdependent embodiments of the functions 280 to expand the portion of considered nodes for one, the other, or both meaning representations 262, 330 based on the particular content of the meaning representations 262, 330, the particular context in which the similarity scoring subsystem 260 is operating, a desired granularity of the similarity scoring process, and so forth. For example, if a particularly in-depth similarity scoring process is desired, the similarity scoring subsystem 260 may expand the number of considered nodes 362 of the meaning representation 262 without doing the same for the search-space meaning representation 330. During a next comparison, the similarity scoring subsystem 260 may de-expand the considered nodes 362 of the meaning representation 262 and expand the considered nodes 362 of the search-space meaning representation 330 to evaluate each permutation of the considered nodes 362. In other embodiments in which a rapid similarity scoring process is performed, the similarity scoring subsystem 260 may alternatively expand the considered nodes 362 of both meaning representations 262, 330 for each comparison. Moreover, although the meaning representations 262, 330 are illustrated as having identical forms and lengths, it should be understood that the similarity scoring subsystem 260 may iteratively compare any suitable meaning representations having non-identical forms and/or lengths.

Moreover, it is also recognized that in some situations, the meaning representation 262 of the utterance 266 corresponds to multiple CCG forms 304, such as both a broad noun-led CCG form and a more specific CCG form (e.g., noun-adjective-verb). As such, the similarity scoring subsystem 260 of certain embodiments may identify multiple form classes supported by the form class database 270 that the meaning representation 262 suits. In such embodiments, the similarity scoring subsystem 260 may advantageously generate similarity scores for each CCG form 304 that describes the meaning representation 262. Then, the similarity scoring subsystem 260 may aggregate the similarity scores for each assigned CCG form of the meaning representation 262, improving operation of the agent automation system 100 by increasing the scope of the meaning search.

In either case, the similarity scoring subsystem 260 may apply a reconciliation function to the similarity scores for each CCG form of the meaning representation, thus reconciling (e.g., consolidating) the respective similarity scoring results from comparisons performed with the multiple CCG form 304 interpretations of the meaning representation 262. The reconciliation function may be stored within the form class database 270, in certain embodiments. As recognized herein, the reconciliation function enables the similarity scoring subsystem 260 to generate and output an aggregate refined similarity score (e.g., aggregate similarity score) that transcends limitations stemming from a single interpretation of the CCG form 304 of the meaning representation 262, such as by retaining a maximum or weight average of the similarity score. Moreover, the reconciliation function of certain embodiments may be individually tailored for each combination of the CCG forms 304, for each client, for each domain in which the similarity scoring subsystem 260 operates, and so forth.

Figure 12:
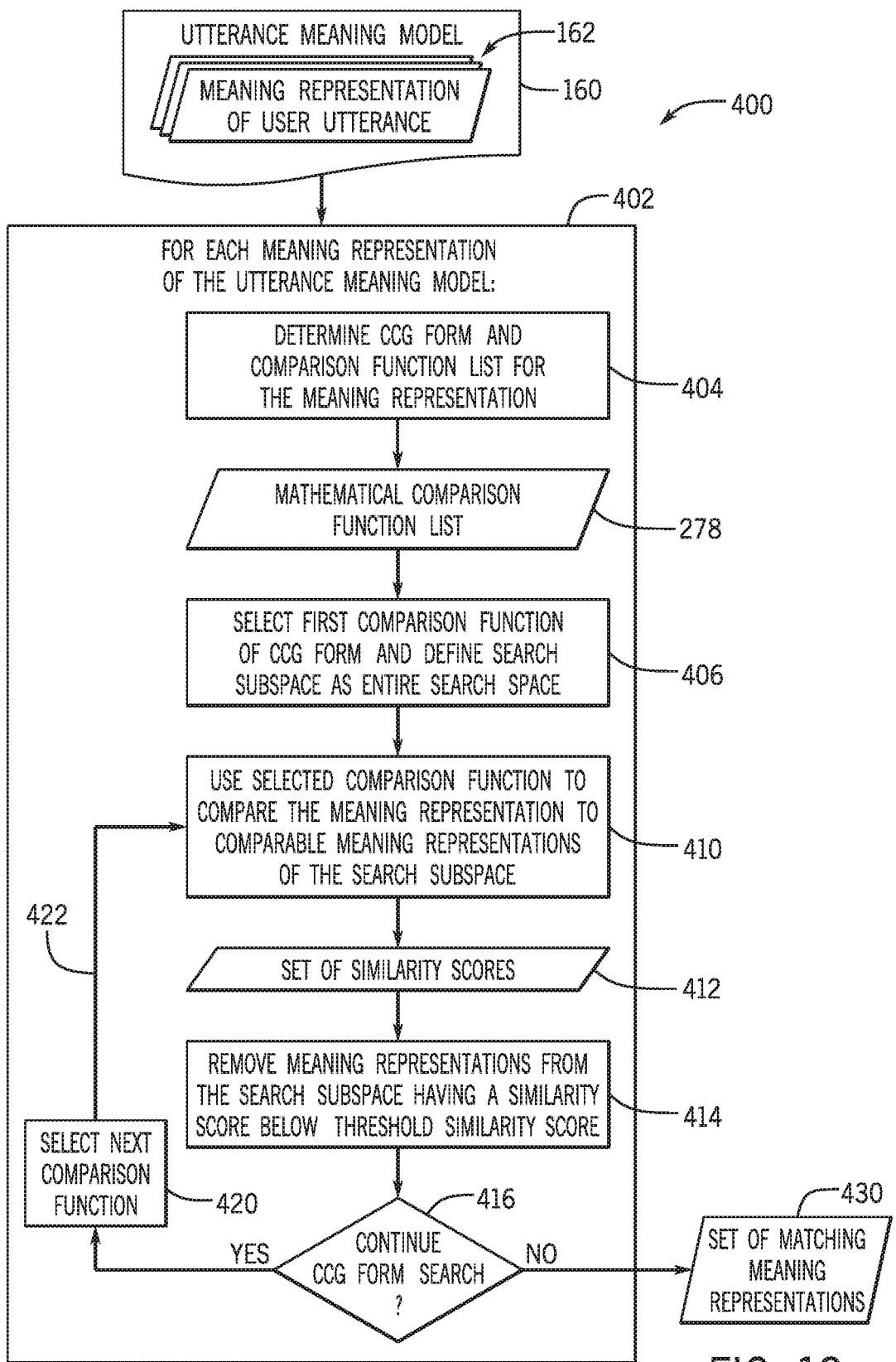
FIG. 12 is a flow diagram of an embodiment of a process by which the similarity scoring subsystem implements the mathematical comparison function list to identify matching meaning representations from the search space, in accordance with aspects of the present technique.

FIG. 12 is a flow diagram illustrating an embodiment of a process 400 by which the similarity scoring subsystem 260 may utilize the mathematical comparison function list 278 to iteratively identify matching meaning representations from the search space 250. As previously noted, the search space 250 is defined by the meaning representations 162 of at least one understanding model 157. As will be understood, the process 400 enables the similarity scoring subsystem 260 to predictively evaluate the similarity between each meaning representations 162 of the utterance meaning model 160 (corresponding to the above-introduced meaning representation 262) and the vast number of meaning representations 158 within the search space 250. The process 400 may be stored in a suitable memory (e.g., memory 86) and executed by a suitable processor (e.g., processor(s) 82) associated with the client instance 42 or the enterprise instance 125, as discussed above with respect to FIGS. 3, 4A, and 4B.

In detail, the similarity scoring subsystem 260 of the illustrated embodiment iterates through (block 402) each meaning representation 262 of the utterance meaning model 160 with a for-each loop. It should be understood that the similarity scoring subsystem 260 may implement any other suitable processing scheme in place of the for-each loop that enables the generation of the refined similarity score 414 for each CCG form 304. For example, the similarity scoring subsystem 260 may alternatively implement a do-while loop, a for loop, a while loop, a do-until loop, and so forth. In any case, for each meaning representation 262 of the utterance meaning model 160, the similarity scoring subsystem determines (block 404) the CCG form of the respective meaning representation 262 and retrieves the associated mathematical comparison function list 278 from the form class database 270. Initializing the iteration parameters for the process 400 based on the CCG form, the similarity scoring subsystem 260 also selects (block 406) the first function 280 of the mathematical comparison function list 278 and defines a search subspace of interest to initially be the entire the search space 250.

For the illustrated embodiment of the process 400 compares (block 410) the meaning representation 262 derived from the user utterance 122 to comparable meaning representations 158 of the search subspace, thereby generating a set 412 of similarity scores that correspond to the comparisons of the meaning representation 262 to the comparable meaning representations of the search subspace. In some embodiments, the similarity scoring subsystem 260 may determine the set 412 of similarity scores based on a distance between meaning vectors (e.g., subtree vectors) of the compared meaning representations. As mentioned, the similarity scoring subsystem 260 implementing the first function 352 utilizes the least amount of computational resources. As such, the similarity scoring subsystem 260 may perform this initial CCG form search and similarity scoring more rapidly and/or efficiently than other searching systems that may utilize a single-complexity comparison function to systematically compare the meaning representation of a user utterance to each meaning representation in a search space or understanding model.

Figure 13:
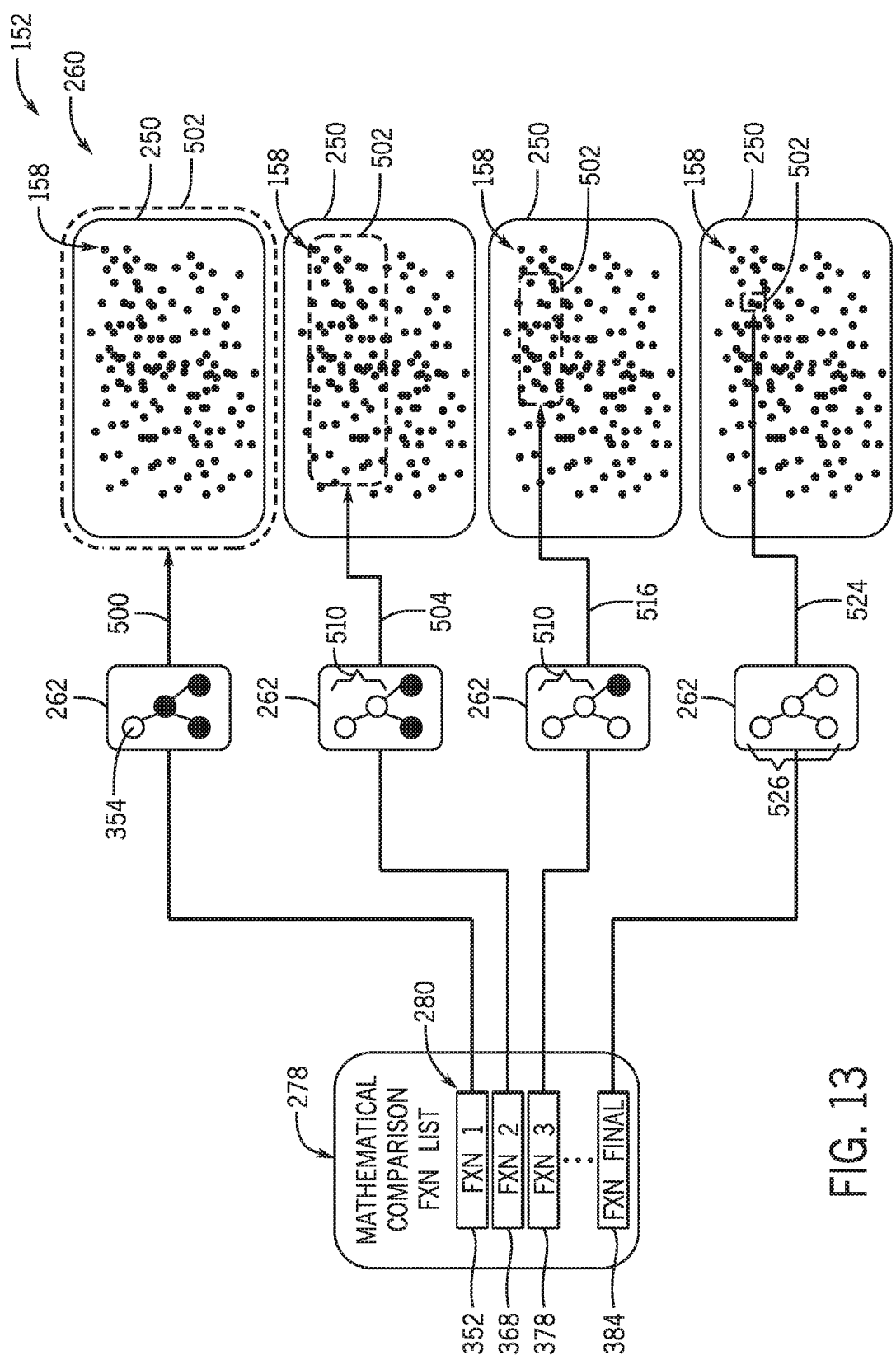
FIG. 13 is a schematic diagram illustrating an embodiment of the similarity scoring subsystem applying the mathematical comparison function list to selectively narrow the search space for identifying meaning representations that match an utterance-based meaning representation, in accordance with aspects of the present technique.

For example, turning now to FIG. 13, FIG. 13 illustrates a schematic diagram of an embodiment of the similarity scoring subsystem 260 applying the mathematical comparison function list 278 to selectively refine the search space 250 into suitable search subspaces 502. For example, during a first comparison 500, the similarity scoring subsystem 260 may apply the first function 352 to compare the meaning representation 262 to comparable meaning representations 158 within a search subspace 502, which is initialized to be the entirety of the search space 250. As recognized herein, this application of the least accurate and most efficient function 352 enables the similarity scoring subsystem 260 to efficiently perform a first-pass search across the search subspace 502. In the present embodiment, the first function 352 considers the root node 354 of the meaning representation 262, though it should be understood that another suitable portion of the meaning representation 262 (e.g., other nodes or combinations of nodes) may be analyzed via the first function 352.

Returning to FIG. 12, the similarity scoring subsystem 260 removes or prunes (block 414) meaning representations 158 from the search subspace 502, wherein the pruned meaning representations 158 have similarity scores of the set 412 that are below a threshold similarity score (e.g., predetermined threshold score). In certain embodiments, the threshold similarity score is a predefined value within the range of possible similarity scores that is stored as a parameter within the similarity scoring subsystem 260. The similarity scoring subsystem 260 may therefore shrink the search subspace 502 for efficient application of subsequent functions 280 to a reduced number of meaning representations 158 of the search subspace 502. Indeed, returning to FIG. 14, the search subspace 502 is narrowed (e.g., constricted, cropped) after the first comparison 500 to remove the meaning representations 158 from the search subspace 502 that are associated with a similarity score of the set 412 that is below the threshold.

In some embodiments, the similarity scoring subsystem 260 receives a user-defined value as the threshold similarity score to calibrate the threshold below which the meaning representations 158 of the search subspace 502 are disregarded. The similarity scoring subsystem 260 may also update the threshold similarity score based on ML techniques, based on the specific context in which the similarity scoring subsystem 260 is presently operating, and so forth. For example, the similarity scoring subsystem 260 may implement a relatively high or selective threshold similarity score (e.g., at least a 90% match) for contexts in which the particular search subspace 502 is very large and/or to further speed the predictive similarity scoring process. Moreover, the threshold similarity score may be individually selected or updated after each function 280 is applied. In more detail, the similarity scoring subsystem 260 disclosed herein may decrease the value or selectivity of the threshold similarity score for a subsequent comparison in response to determining that more than a threshold number of meaning representations 158 met the threshold similarity score in a previous comparison.

Returning to the process 400 of FIG. 12, the similarity scoring subsystem 260 determines (block 416) whether the CCG form search set forth by block 410 is to be continued. As recognized herein, the similarity scoring subsystem 260 may determine to continue the CCG form search based on one or multiple suitable stop conditions being met. For example, the similarity scoring subsystem 260 may end the CCG form search in response to each meaning representation being pruned from the search subspace 502 (e.g., indicative of no matches), a threshold number of meaning representations remaining within the search subspace (e.g., indicative of the most-likely matches), the recently-applied function 280 indicating that embedded stop conditions within the function 280 have been met, all functions 280 of the mathematical comparison function list 278 having been applied, and so forth.

In response to determining at block 416 that the CCG form search is to be continued, the similarity scoring subsystem 260 selects (block 420) the next function 280 of the mathematical comparison function list 278. Then, as indicated by arrow 422, the similarity scoring subsystem 260 returns to block 410 to compare the meaning representation 262 to remaining, comparable meaning representations 158 of the search subspace 502. The similarity scoring subsystem 260 therefore refines (e.g., modifies, updates) the set 412 of similarity scores associated with the remaining comparable meaning representations of the search subspace 502 by utilizing a more expensive function 280 of the mathematical comparison function list 278. After each comparison, the similarity scoring subsystem 260 may store an array of the various sets 412 of similarity scores generated via the process 400, or alternatively, replace each previously-generated similarity score of the set 412 with its more accurate counterpart. Indeed, because more processing resources are utilized during application of subsequent functions 280, the set 412 of similarity scores is generally improved in accuracy and/or precision as more functions 280 are applied. Based on the set 412 of similarity scores, the similarity scoring subsystem 260 performing the illustrated process 400 prunes (block 404) the search space 250 of the meaning representations 158 associated with respective similarity scores of the set 412 that are below the threshold similarity score.

With reference again to FIG. 13, to refine the set 412 of similarity scores and prune the search subspace 502, the similarity scoring subsystem 260 applies the second function 368 to compare the meaning representations 262 to the remaining meaning representations 158 within the size-reduced search subspace 502. The similarity scoring subsystem 260 may therefore further shrink the search subspace 502 to suitable candidates that meet the threshold similarity score. In certain embodiments, the structure of the function 180 guides uncovering or expansion of respective nodes of the compared meaning representations, such as inherently based on terms within the functions 280 of the mathematical comparison function list 278. For example, the first function 352 may include a single term that compares the root node 354 of the meaning representation to the meaning representations 158 of the search subspace 502, while the second function 368 may include one or multiple terms that compare an expanded portion of the meaning representation 262 to the meaning representations 158.

Accordingly, the similarity scoring subsystem 260 iteratively applies functions 280 that are progressively more accurate and more costly to the surviving (e.g., in-beam) meaning representations 158 of the search subspace 502 for a given comparison. Continuing discussion of the process 400 of FIG. 12 with respect to FIG. 13, the similarity scoring subsystem 260 may implement the third function 378 during a third comparison 516 to compare the same uncovered portion 510 of the meaning representation 262 to a further-pruned embodiment of the search subspace 502, and so forth. As such, the similarity scoring subsystem 260 of the present embodiment is designed to implement the final function 384 during a final comparison 524 to compare an entirety 526 of the meaning representation 262 to a final embodiment of the search subspace 502, conserving use of the most computationally-intensive final function 384 for a markedly reduced number of remaining meaning representation 158 candidates. Indeed, in certain cases, the final comparison 524 of FIG. 13 may leverage an entirety of the information available within the meaning representation 262 to generate a set of the meaning representations 158 from the search space 250 that suitably match the meaning representation 262. In other embodiments, as noted above, the final function 384 may consider a portion of the meaning representation 262 via any other suitably resource-intensive process, such as querying an external language model.

As such, returning to FIG. 12, the similarity scoring subsystem 260 may determine that the stop conditions of the CCG form search have been met at block 416, then output a set 430 of matching meaning representations identified from the search subspace 502. Therefore, the similarity scoring subsystem 260 may efficiently identify and provide the set 430 of matching meaning representations to other components of the NLU framework 104 for subsequent determination of the extracted artifacts 140.

Technical effects of the present disclosure include providing an agent automation framework that implements a meaning search subsystem capable of proficiently narrowing (e.g., winnowing) a search space populated with meaning representations derived from sample utterances, thereby improving identification of meaning representations that suitably match a meaning representation of a received user utterance. Present embodiments are particularly directed to a similarity scoring subsystem of the meaning search subsystem that efficiently and predictively compares meaning representations via CCG techniques. That is, based on an identified CCG form of a particular meaning representation, the similarity scoring subsystem may determine a mathematical comparison function list that enables quantifications of the similarity between meaning representations. Comparison functions of the list are chronologically ordered to enable the similarity scoring subsystem to perform the most efficient and least-costly comparisons between the meaning representations and determine similar scores therebetween. Based on the similarity scores, the similarity scoring subsystem may iteratively identify particularly-similar meaning representations within the search space and prune (e.g., shrink, reduce) the search space to these meaning representations, then implement more computationally-intensive comparison functions on a same number or an increased number of nodes of the meaning representations. That is, iterative application of selective node uncovering and/or increasing resource utilization generally considers more data of the compared meaning representations via increasingly-complex comparison functions, while narrowing in on potentially-matching meaning representations within the search space. As such, the present techniques for predictive similarity scoring enable targeted discovery of meaning representation matches that enable the NLU framework to efficiently extract artifacts, while reducing computational overhead to a level suitable for enterprise-level natural language engagement with multiple users.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An agent automation system, comprising:
a memory configured to store a natural language understanding (NLU) framework including a similarity scoring subsystem having a form class database; and
a processor configured to execute instructions to cause the similarity scoring subsystem of the NLU framework to perform actions comprising:
receiving a meaning representation of a user utterance;
identifying a cognitive construction grammar (CCG) form of the meaning representation;
determining at least one form class entry of the form class database that matches the CCG form of the meaning representation; and
retrieving a mathematical comparison function list from the at least one form class entry, wherein the mathematical comparison function list includes a set of ordered functions, wherein the similarity scoring subsystem progressively utilizes more computationally-expensive functions to compare at least a portion of the meaning representation to at least a search-space portion of a search-space meaning representation to determine a similarity score therebetween, and wherein the agent automation system provides an agent response to the user utterance based on the similarity score.

2. The agent automation system of claim 1, wherein the search-space meaning representation is one of a plurality of search-space meaning representations defining a search space of the NLU framework, and wherein the instructions cause the similarity scoring subsystem to perform actions comprising searching the search space for a subset of the plurality of search-space meaning representations that matches the meaning representation of the user utterance.

3. The agent automation system of claim 1, wherein the instructions cause the similarity scoring subsystem to perform actions comprising comparing the meaning representation to the search-space meaning representation, via the mathematical comparison function list, to determine the similarity score between the meaning representation and the search-space meaning representation.

4. The agent automation system of claim 3, wherein the similarity scoring subsystem is configured to compare the meaning representation to the search-space meaning representation by:
comparing a first root node of the meaning representation to a second root node of the search-space meaning representation to determine the similarity score; and
comparing the first root node and a first dependent node of the meaning representation to the second root node and a second dependent node of the search-space meaning representation to refine the similarity score.

5. The agent automation system of claim 4, wherein the instructions cause the similarity scoring subsystem to perform actions comprising:
determining whether the similarity score is less than a predetermined threshold score; and
disregarding the search-space meaning representation from subsequent comparisons to the meaning representation in response to determining that the similarity score is less than the predetermined threshold score.

6. The agent automation system of claim 1, wherein the meaning representation comprises an utterance tree structure that includes a root node and at least one dependent node semantically coupled to the root node.

7. The agent automation system of claim 6, wherein the at least a portion of the meaning representation is the root node and the at least a search-space portion of the search-space meaning representation is a search-space root node of the search-space meaning representation, such that the similarity score quantifies a similarity between a subtree vector of the root node and a subtree vector of the search-space root node.

8. The agent automation system of claim 1, wherein the CCG form comprises a first CCG form, the at least one form class entry comprises a first form class entry, and the mathematical comparison function list comprises a first mathematical comparison function list, and wherein the instructions cause the similarity scoring subsystem to perform actions comprising:

identifying a second CCG form of the meaning representation;

determining a second form class entry of the form class database that matches the second CCG form of the meaning representation; and retrieving a second mathematical comparison function list from the second form class entry.

9. The agent automation system of claim 8, wherein the instructions cause the similarity scoring subsystem to perform actions comprising:

comparing the meaning representation to the search-space meaning representation via the first mathematical comparison function list to determine a first similarity score;

comparing the meaning representation to the search-space meaning representation via the second mathematical comparison function list to determine a second similarity score; and aggregating the first similarity score and the second similarity score into an aggregate similarity score via a reconciliation function, wherein the aggregate similarity score enables the similarity scoring subsystem to determine whether the search-space meaning representation is a match to the meaning representation.

10. A method of operating a similarity scoring subsystem of an agent automation system, comprising:

for each search-space meaning representation of a plurality of search-space meaning representations defining a search space of the agent automation system, comparing, via a plurality of comparison functions of a mathematical comparison function list, a first portion of a meaning representation of a received user utterance to a plurality of search-space portions of the plurality of search-space meaning representations to generate a plurality of initial similarity scores, wherein the mathematical comparison function list includes a set of ordered functions, and wherein the similarity scoring subsystem progressively utilizes more computationally-expensive functions when comparing the meaning representation to the plurality of search-space meaning representations;

pruning the search space of dissimilar search-space meaning representations of the plurality of search-space meaning representations, wherein each of the dissimilar search-space meaning representations provide a respective one of the plurality of initial similarity scores that is below a predetermined score threshold;

increasing a number of nodes considered between the meaning representation and the plurality of search-space meaning representations remaining within the search space;

for each one of the plurality of search-space meaning representations remaining within the search space, comparing, via the plurality of comparison functions of the mathematical comparison function list, the considered nodes of the meaning representation and the plurality of search-space meaning representations to generate a plurality of refined similarity scores;

pruning the search space of the dissimilar search-space meaning representations that provide a respective one of the plurality of refined similarity scores that is below the predetermined score threshold; and identifying a meaning representation match for the meaning representation from any search-space meaning representations of the plurality of search-space meaning representations remaining within the search space, wherein the agent automation system provides an agent response to the received user utterance based on the meaning representation match.

11. The method of claim 10, wherein increasing the number of nodes considered comprises considering an additional node of the meaning representation and an additional search-space node of the plurality of search-space meaning representations remaining within the search space.

12. The method of claim 10, comprising:

after pruning the search space of any dissimilar search-space meaning representations having a respective one of the plurality of refined similarity scores below the predetermined score threshold, determining whether each node of the meaning representation has been considered; and in response to determining that at least one node of the meaning representation has not been considered, returning to increasing the number of nodes considered between the meaning representation and the plurality of search-space meaning representations remaining within the search space.

13. The method of claim 10, comprising determining the plurality of comparison functions by:

identifying a cognitive construction grammar (CCG) form of the meaning representation;

determining at least one form class entry of a form class database that matches the CCG form of the meaning representation; and retrieving the mathematical comparison function list comprising the plurality of comparison functions from the at least one form class entry.

14. The method of claim 10, wherein determining the at least one form class entry that matches the CCG form of the meaning representation comprises identifying that the form class database comprises the mathematical comparison function list for comparing the CCG form of the meaning representation to a comparable CCG form of at least one of the plurality of search-space meaning representations.

15. The method of claim 10, comprising:

determining that the meaning representation comprises a plurality of CCG forms;

determining a respective refined similarity score for comparing the meaning representation having a respective CCG form interpretation from the plurality of CCG forms to the plurality of search-space meaning representations; and aggregating, via a reconciliation function of the similarity scoring subsystem, the respective refined similarity score for each CCG form interpretation into an aggregate similarity score.

16. The method of claim 15, wherein the reconciliation function specifies that the aggregate similarity score is a maximum or a weighted average of the respective refined similarity score for each CCG form.

17. A non-transitory, computer-readable medium storing instructions that, when executed by one or more processors of an agent automation system, cause the agent automation system to implement a similarity scoring subsystem to:

identify a cognitive construction grammar (CCG) form of a meaning representation corresponding to a received user utterance;

determining at least one form class entry of a form class database that matches the CCG form of the meaning representation;

retrieving a mathematical comparison function list that corresponds to the CCG form of the meaning representation, wherein the mathematical comparison function list includes a set of ordered functions, wherein the similarity scoring subsystem progressively utilizes more computationally-expensive functions to compare the meaning representation and a search-space meaning representation; and compare the meaning representation to the search-space meaning representation by iteratively:

applying a respective function of the mathematical comparison function list to determine a similarity score quantifying a similarity between a first considered portion of the meaning representation and a second considered portion of the search-space meaning representation, and applying a subsequent function of the mathematical comparison function list to refine the similarity score, until the similarity score is representative of the similarity between an entirety of the meaning representation and at least a portion of the search-space meaning representation or until the subsequent function is a highest-cost function of the mathematical comparison function list; wherein, after comparing the meaning representation to the search-space meaning representation, the agent automation system provides an agent response to the received user utterance based on the similarity score.

18. The non-transitory, computer-readable medium of claim 17, wherein the search-space meaning representation is one of a plurality of search-space meaning representations defining a search space of the agent automation system.

19. The non-transitory, computer-readable medium of claim 18, wherein the instructions are configured to cause the agent automation system to implement the similarity scoring subsystem to:

after each refinement of the similarity score, narrow the search space to similar ones of the plurality of search-space meaning representations that provide a respective similarity score above a predetermined score threshold; and after the respective similarity score is representative of the similarity between the entirety of the meaning representation, identify the similar ones of the plurality of search-space meaning representations remaining within the search space as matches to the meaning representation.

* * * * *